United States Patent

Bauman et al.

[11] Patent Number: 5,946,710
[45] Date of Patent: Aug. 31, 1999

[54] SELECTABLE TWO-WAY, FOUR-WAY DOUBLE CACHE INTERLEAVE SCHEME

[75] Inventors: Mitchell A. Bauman, Circle Pines; Donald C. Englin, Shoreview, both of Minn.

[73] Assignee: Unisys Corporation, Blue Bell, Pa.

[21] Appl. No.: 08/748,772

[22] Filed: Nov. 14, 1996

[51] Int. Cl.[6] .................................................. G06F 12/08
[52] U.S. Cl. ........................ 711/129; 711/130; 711/153
[58] Field of Search .................................... 711/147, 148, 711/150, 153, 157, 123, 130, 129, 173

[56] References Cited

U.S. PATENT DOCUMENTS

| | | | |
|---|---|---|---|
| 3,812,473 | 5/1974 | Tucker | 711/157 |
| 4,586,133 | 4/1986 | Steckler | 364/200 |
| 4,985,829 | 1/1991 | Thatte et al. | 364/200 |
| 5,029,070 | 7/1991 | McCarthy et al. | 364/200 |
| 5,043,874 | 8/1991 | Gagliardo et al. | 711/150 |
| 5,265,232 | 11/1993 | Gannon et al. | 395/425 |
| 5,265,235 | 11/1993 | Sindhu et al. | 395/425 |
| 5,355,467 | 10/1994 | MacWilliams et al. | 395/425 |
| 5,359,723 | 10/1994 | Matthews et al. | 395/425 |
| 5,392,416 | 2/1995 | Doi et al. | 395/425 |
| 5,412,788 | 5/1995 | Collins et al. | 711/157 |
| 5,463,755 | 10/1995 | Dumarot et al. | 711/148 |
| 5,574,944 | 11/1996 | Stager | 711/153 |
| 5,680,571 | 10/1997 | Bauman | 711/122 |
| 5,694,573 | 12/1997 | Cheong et al. | 711/122 |
| 5,740,401 | 4/1998 | Hanawa et al. | 711/152 |

OTHER PUBLICATIONS

Patterson and Hennessy, "Computer Organization and Design", 1994, pp. 481–486.

*Primary Examiner*—Eddie P. Chan
*Assistant Examiner*—Gary J. Portka
*Attorney, Agent, or Firm*—Charles A. Johnson; Mark T. Starr; Nawrocki, Rooney & Sivertson, P.A.

[57] ABSTRACT

Method and apparatus for maximizing cache memory throughput in a system where a plurality of requesters may contend for access to a same memory simultaneously. The memory utilizes an interleaved addressing scheme wherein each memory segment is associated with a separate queuing structure and the memory is mapped noncontiguously within the same segment so that all segments are accessed equally. Throughput is maximized as the plurality of requesters are queued evenly throughout the system.

14 Claims, 19 Drawing Sheets

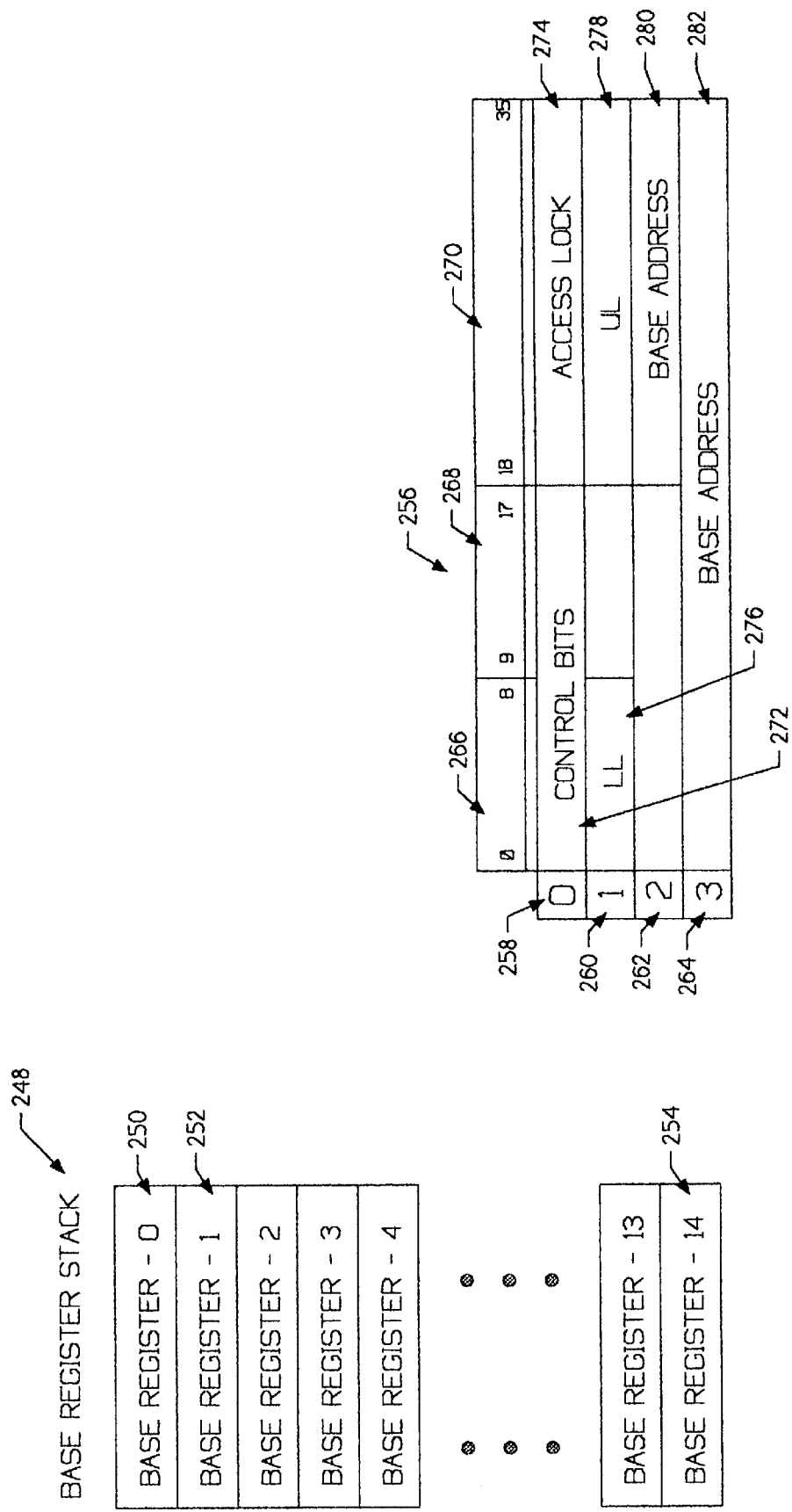

FIG. 15

| SCAN BIT | | REQUESTER ADDRESS | | | | | | SEGMENT SELECTION | | | | CONFIGURATION |
|---|---|---|---|---|---|---|---|---|---|---|---|---|
| CONFIG. | INTLV. | A27 | A28 | A49 | A50 | | | 0 | 1 | 2 | 3 | |
| 0 | 0 | 0 | X | X | X | | | EC NO INTERLEAVE | | | | |
| 0 | 0 | 1 | X | X | X | | S | EC NO INTERLEAVE | | | | |
| 0 | 1 | X | X | X | 0 | S | | EC 2-WAY INTERLEAVE | | | | |
| 0 | 1 | X | X | X | 1 | S | | EC 2-WAY INTERLEAVE | | | | |
| 1 | 0 | 0 | 0 | X | X | | S | MC NO INTERLEAVE | | | | |
| 1 | 0 | 0 | 1 | X | X | S | | MC NO INTERLEAVE | | | | |
| 1 | 0 | 1 | 0 | X | X | | | S | | MC NO INTERLEAVE | | |
| 1 | 0 | 1 | 1 | X | X | | | | S | MC NO INYERLEAVE | | |
| 1 | 1 | X | X | 0 | 0 | | S | MC 4-WAY INTERLEAVE | | | | |
| 1 | 1 | X | X | 0 | 1 | S | | MC 4-WAY INTERLEAVE | | | | |
| 1 | 1 | X | X | 1 | 0 | | | S | | MC 4-WAY INTERLEAVE | | |
| 1 | 1 | X | X | 1 | 1 | | | | S | MC 4-WAY INTERLEAVE | | |

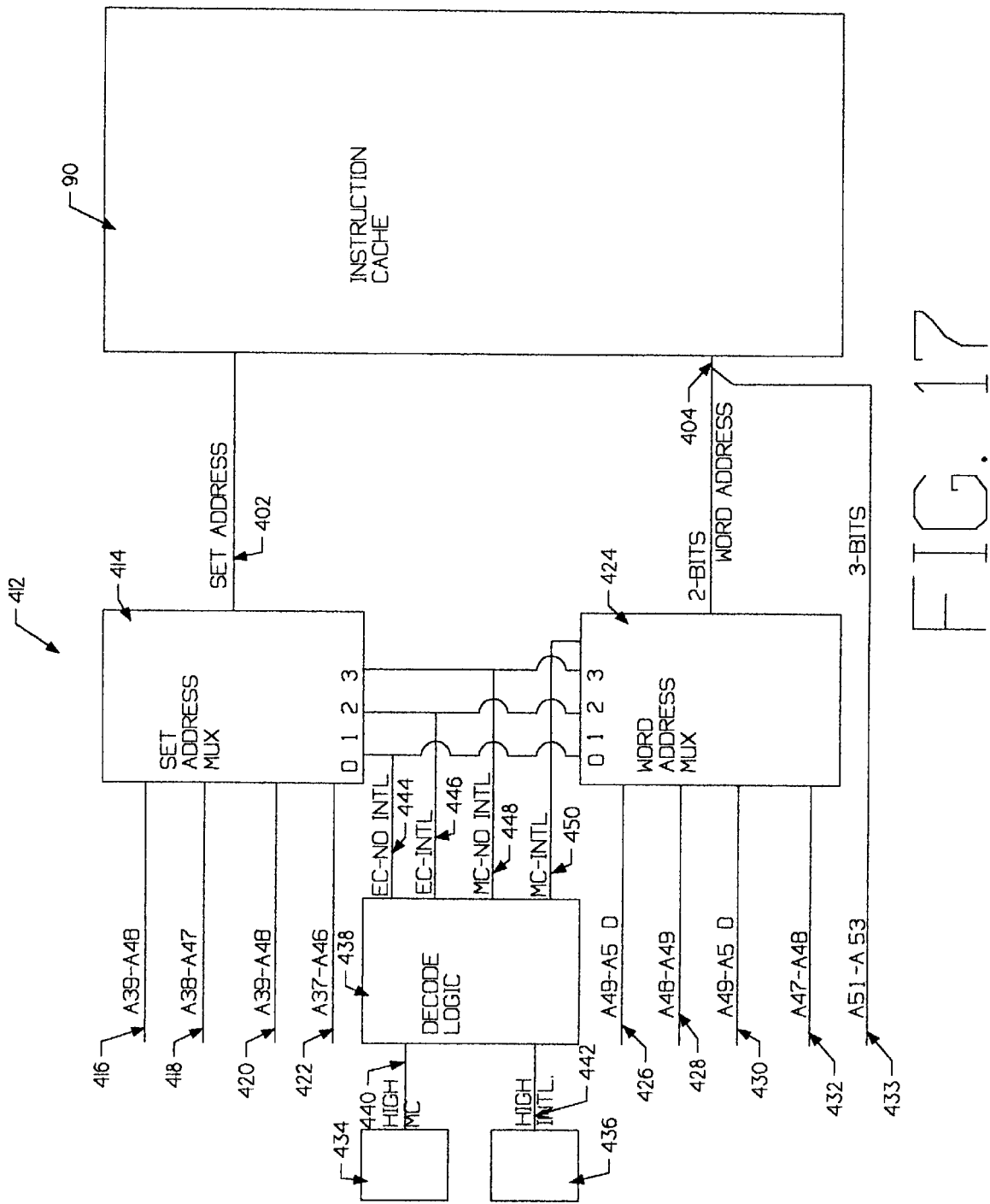

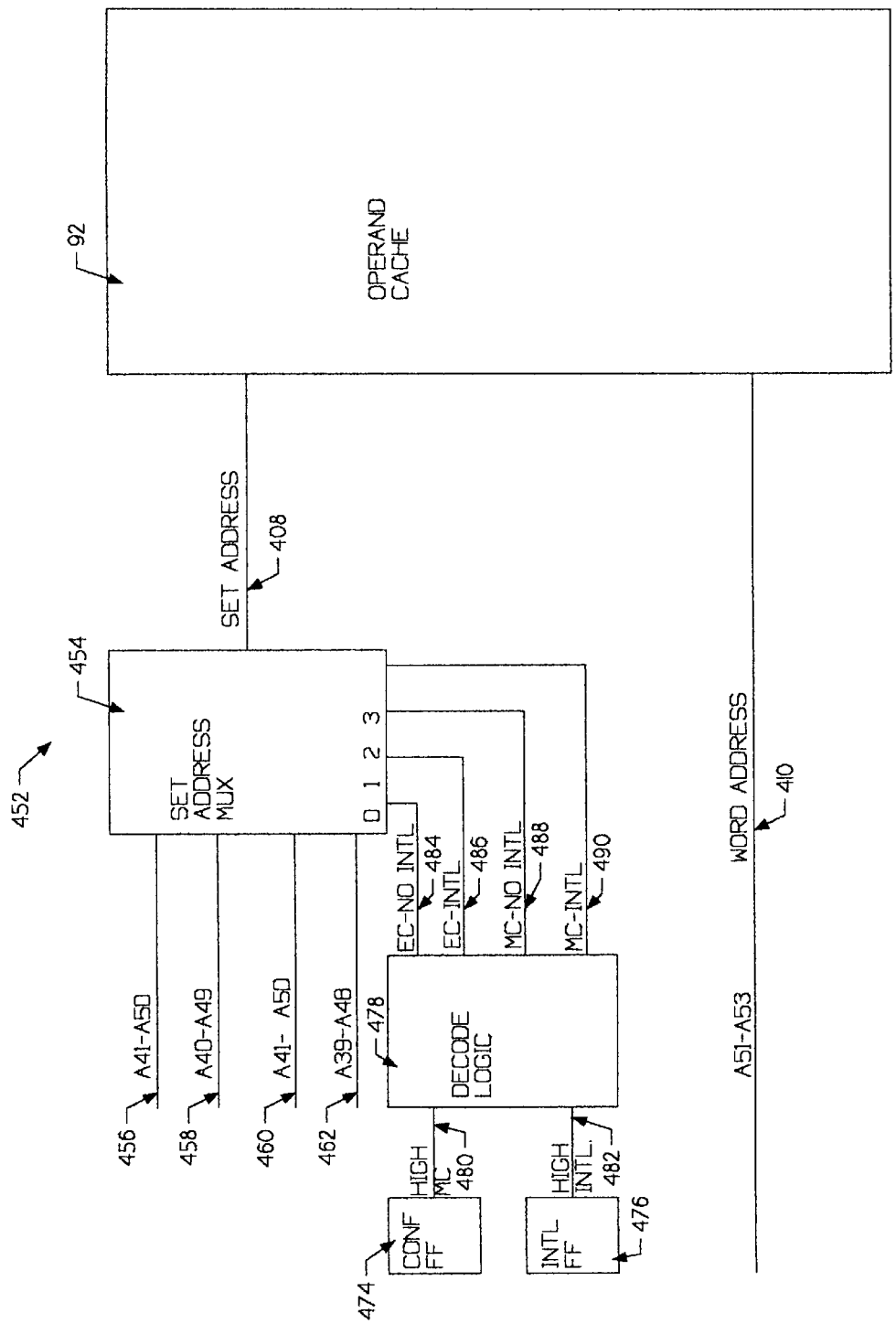

SELECTABLE TWO-WAY, FOUR-WAY DOUBLE CACHE INTERLEAVE SCHEME

CROSS REFERENCE TO CO-PENDING APPLICATIONS

The present application is related to U.S. patent application Ser. No. 08/579,683, filed Dec. 28, 1995, entitled "Muti-Processor Data Processing System With Multiple, now U.S. Pat. No. 5,680,571, Separate Instruction and Operand Second Level Caches", U.S. patent application Ser. No. 08/288,651, which is a continuation of Ser. No. 07/762,282, filed Sep. 19, 1991, entitled "Cooperative Hardware and Microcode Control System for Pipelined Instruction Execution", now U.S. Pat. No. 5,577,259, and U.S. patent application Ser. No. 08/235,196, which is a continuation of Ser. No. 07/762,276, filed Sep. 19, 1991, entitled "Data Coherency Protocol for Multi-Level Cached High Performance Multiprocessor System", all assigned to the assignee of the present invention and all incorporated herein by reference.

BACKGROUND OF THE INVENTION

1. Field of the Invention

The present invention relates to general purpose digital data processing systems, and more particularly to such systems that employ shared memories accessed simultaneously by a plurality of users.

2. Description of the Prior Art

In most general purpose digital computers, it is desirable to have a computer storage system which can efficiently return data from a main memory. The computer storage system may be comprised of a shared memory resource. The concept of using a shared memory resource results from the design of general purpose digital computers, wherein often times additional memory resources, such as memory modules, are added at later points in time. In multi-processor computing systems, multiple requestors can request access to the same shared memory resource. Typically, these memories are divided into segments wherein the segments are mapped contiguously throughout the address space. Each of the multiple requestors can request access to the same memory segment simultaneously. As a result, requests not able to be serviced must be queued until they can be processed by a memory controller managing the requests. This can have the unfortunate result of decreasing overall system performance. It is desirable therefore to minimize queuing times to ensure maximum overall system performance.

One approach to solve this problem is to add additional queuing structures to support a plurality of requests. For example, if several instruction processors executing programs are utilizing the shared memory resource, adding additional queuing structures would reduce the backlog of queued requests. In one example, in a system utilizing a shared memory resource of 128 megawords of memory, four separate queuing structures may be added, each associated with a particular segment. Of the 27 bits necessary to access the 128 megaword shared memory resource, the two most significant bits, bits 26 and 27, may be used to select between the four segments, and the remaining bits, bits 1–25, used to address a particular word. If the 26th and 27th bit select between the four segments, a separate queuing structure is associated with each 32 megaword memory segment. Utilizing four queuing structures rather than one can increase system throughput by minimizing queuing or wait time. However, the additional queuing structures still do not prevent a backlog of queued requests if several instruction processors, for example, are executing programs resident in the same memory segment. This is because a disproportionate percentage of the requests will be directed at the same segment. That is, if two separate instruction processors are executing programs resident in the same 32 megaword memory segment, a backlog of queued requests could result since only one queuing structure serves the 32 megaword memory segment. This backlog of queued requests would therefore decrease overall system performance.

Another approach which has been used is to associate a cache memory with each individual queuing structure. While this approach can improve system performance by increasing the cache hit rate, a backlog of queued requests can still result if a disproportionate percentage of the requests are directed at the same memory segment. Thus associating the cache memory with each individual queuing structure would still not improve overall system performance.

Another disadvantage is that within the shared memory resource, multiple bit failures can occur. When the address space is mapped contiguously, as with the above approach, these multiple bit errors can be difficult to correct with known parity checking algorithms. This can be especially problematic with the very small feature sizes of the Dynamic Random Access Memories (DRAMs) and Static Random Access Memories (SRAMs) currently used in these memory resources. With minimum feature sizes approaching 0.5 microns or less, failures are more likely to cluster within a particular physical area in the DRAM or SRAM, thus affecting several adjacent memory bit storage cells and causing multiple bit errors.

SUMMARY OF THE INVENTION

The present invention overcomes the disadvantages found in the prior art by providing a method and apparatus which utilizes an interleaved addressing scheme wherein each memory segment is associated with a separate queuing structure and the memory is mapped noncontiguously within a same segment so that all segments are accessed equally. Cache memory throughput is maximized as the plurality of requestors are queued evenly throughout the system.

In an exemplary embodiment of the present invention, the 128 megaword shared memory is divided into four segments, each having its own queuing structure. With 128 megawords, a 27-bit address is necessary to access the total memory address space. Multiple requestors in a multi-processor computing system can request access to the same memory segment simultaneously. The address mapping is selected to be the entry-level (EC) mode with two-way interleaved, addressing. Two scannable bits, a configuration bit and an interleave bit, select the configuration. mode. In addition to the EC mode with two-way interleave, the configuration mode can include the EC mode without interleave, the maximum-level (MC) configuration without interleave, and the MC configuration with four-way interleave. In the exemplary embodiment the configuration bit is equal to a logical 0, and the interleave bit is equal to a logical 1, thus selecting the EC configuration with two-way interleave. The segment select bits, defined within the memory address space, select a new segment after every 8 word block. Each segment is not mapped contiguously since each segment contains 64 megawords. The instruction cache set address and instruction word address are defined within the 15 least significant bits of the memory address. Thus when interleave is selected, the 10 address bits defining the instruction cache set address must each be shifted one position to the next most significant bit position to accommodate to the segment select bit. The five address bits defining the instruction cache word address are the five least significant bits of the memory address, thus only the two most significant of these five least significant bits must be shifted one position to the next most significant bit position to accommodate the segment select bit. If the operand cache is being addressed, the 10 address bits defining the operand cache set address must each be shifted one position to the next most significant bit position to accommodate to the segment select bit. The operand cache word address occupies the three least significant bit positions of the memory address and are not shifted if two-way interleave is selected.

The exemplary embodiment further includes a segment select associated with each segment to select a particular segment and to associate an instruction cache and operand cache, and a queue, with each particular segment. The segment select includes a segment multiplexer and a word multiplexer, both coupled to the plurality of requesters or instruction processors to decode the selection for a particular segment and select the proper address bits for the segment queue. The segment queue stacks address requests for access of data from the instruction cache and operand cache, and the memory storage units. Depending on whether instruction or operand data is being accessed, if the requested data is not available in the instruction cache or operand cache, the access to either of the two memory storage units will be completed. An instruction cache address decode decodes the instruction cache set address and instruction cache word address corresponding with the selected configuration, here the EC configuration with two-way interleave. The instruction cache receives the instruction cache set address and the instruction cache word address and determines if the requested data is available. If the operand cache is accessed, the operand cache address decode decodes the operand cache set address and operand cache word address corresponding to the EC configuration with two-way interleave. The operand cache tag directory receives the operand cache set address and operand cache word address and determines if the requested data is available. If the data is not available within the instruction cache or operand cache, the requested data is retrieved from either of the two memory storage units.

In a preferred embodiment of the present invention, the 128 megaword shared memory is divided into four segments, each having its own queuing structure. The address mapping is selected to be the MC configuration with four-way interleaved addressing. Two scannable bits, a configuration bit and an interleave bit, select the MC configuration. In the preferred embodiment the configuration bit is equal to a logical 1, and the interleave bit is equal to a logical 1, thus selecting the DC configuration with four-way interleave. The segment select bits, defined within the memory address space, select a new segment after every 8 word block. Each segment is not mapped contiguously since each segment contains 32 megawords. The instruction cache set address and instruction word address are defined within the 15 least significant bits of the memory address. Thus when fodr-way interleave is selected, the 10 address bits defining the instruction cache set address must each be shifted two positions to the next two most significant bit positions to accommodate to the segment select bits. The five address bits defining the instruction cache word address are the five least significant bits of the memory address, and only the two most significant of these five least significant bits must be shifted two positions to the next two most significant bit positions to accommodate the segment select bit. If the operand cache is being addressed, the 10 address bits defining the operand cache set address must each be shifted two positions to the next two most significant bit positions to accommodate to the two segment select bits. The operand cache word address occupies the three least significant bit positions of the memory address and are not shifted if two-way interleave is selected.

The preferred embodiment further includes a segment select associated with each segment to select a particular segment and to associate the instruction cache and operand cache, and the queue, with a particular segment. The segment select includes a segment multiplexer and a word multiplexer, both coupled to the plurality of requesters-or instruction processors to decode the selection for a particular segment and select the proper address bits for a segment queue. The segment queue stacks address requests for access of data from the instruction cache and operand cache and the memory storage units. Depending on whether an instruction or operand is being accessed, if the requested data is not available in the instruction cache or operand cache, the access to either of the two memory storage units will be completed. An instruction cache address decode decodes the instruction cache set address and instruction cache word address corresponding to the selected configuration, here the MC configuration with four-way interleave. The instruction cache tag directory receives the instruction cache set address and the instruction cache word address and determines if the requested data is available. If the operand cache is accessed, the operand cache address decode decodes the operand cache set address and operand cache word address corresponding to the MC configuration with four-way interleave. The operand cache receives the operand cache set address and operand cache word address and determines if the requested data is available. If the data is not available within the instruction cache or operand cache , the requested data is retrieved from either of the two memory storage units.

The description given herein does not limit the scope of the invention to any particular interleave configuration. As apparent from the description above, the elements described can accommodate any particular interleave configuration desired.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 9 shows an exemplary base register stack;

FIG. 10 shows a typical base register entry;

FIG. 15 shows a segment address interleave map;

FIG. 17 is a block diagram showing the instruction cache address decode;

FIG. 18 is a block diagram showing the operand cache address decode; and

DETAILED DESCRIPTION OF THE PREFERRED EMBODIMENTS

Figure 1:
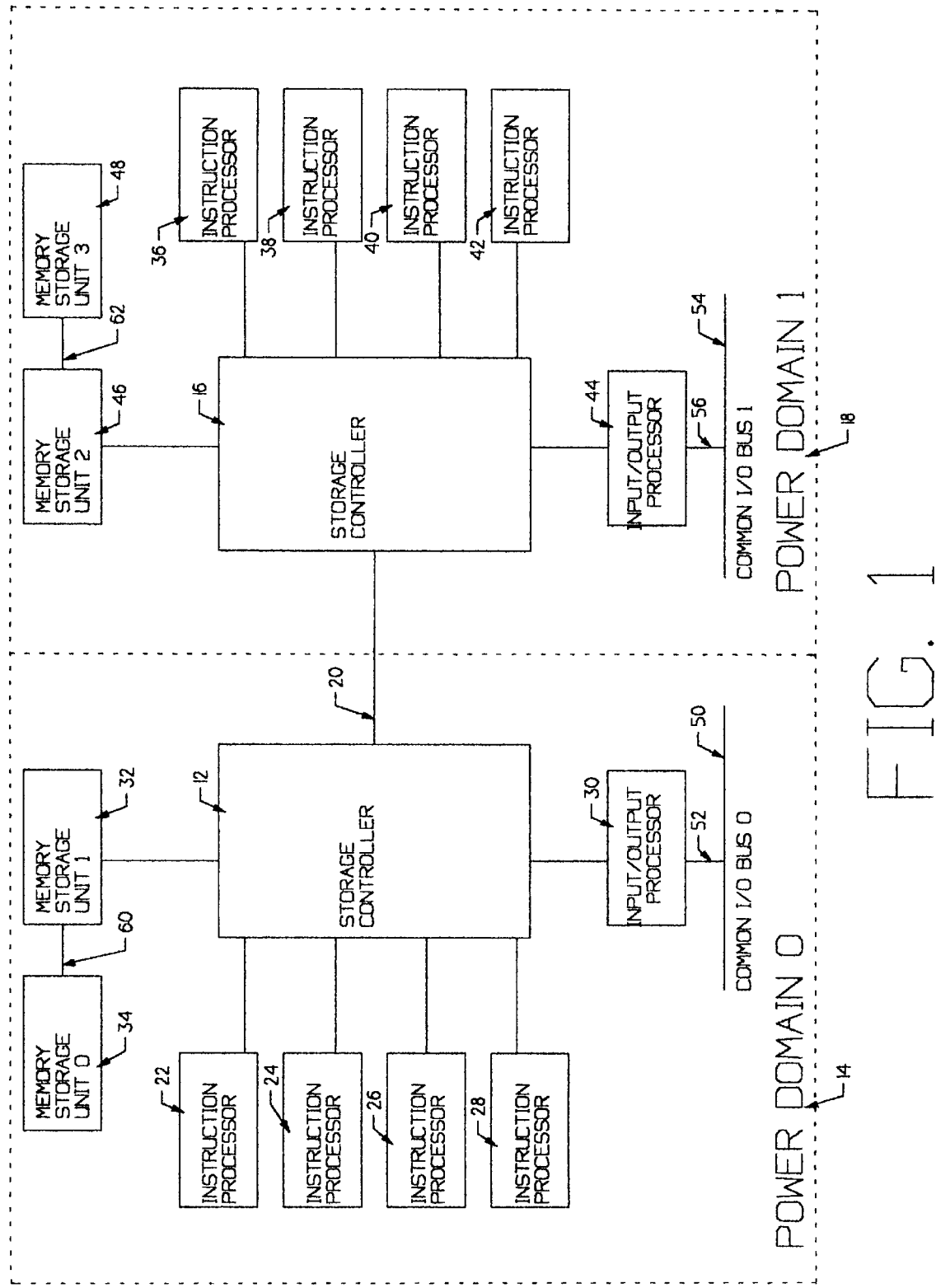
FIG. 1 is a schematic diagram of a fully populated data processing system incorporating the present invention.

FIG. 1 is an overall diagram of fully populated data processing system according to the present invention. Data processing system 10 includes two individual processing clusters each contained within its own power domain. Furthermore, each individual processing cluster has its own storage controller and point-to-point communication with the other cluster via a storage controller-to-storage controller interface.

Storage controller 12 is contained within power domain 0–14, and storage controller 16 is contained within power domain 1–18. Storage controller 12 is coupled to storage controller 16 via interface 20. Storage controller 12 is fully populated with instruction processor 22, instruction processor 24, instruction processor 26, instruction processor 28, main memory module 32 and main memory module 34. Storage controller 16 is fully populated with instruction processor 36, instruction processor 38, instruction processor 40, instruction processor 42, main memory module 46 and main memory module 48. Storage controller 12 is coupled to common I/O bus 50 via path 52, and Storage controller 16 is coupled to common I/O bus 54 via path 56. Main memory module 32 is coupled to main memory module 34 vial path 60. Main memory module 46 is coupled to main memory module 48 via path 62. Each of instruction processors 22, 24, 26 and 28 (along with similar instruction processors 36, 38, 40, and 42) has internal dedicated cache resources in the form of an instruction cache and an operand cache. These elements, along with the associated data invalidity logic, are described in more detail below. A more general description of the construction and operation of instruction processors 22, 24, 26 and 28 (along with similar instruction processors 36, 38, 40, and 42) may be found in the above-referenced and commonly assigned co-pending U.S. patent application Ser. No. 07/762,276, filed Sep. 19, 1991 which has been incorporated by reference.

Figure 2:
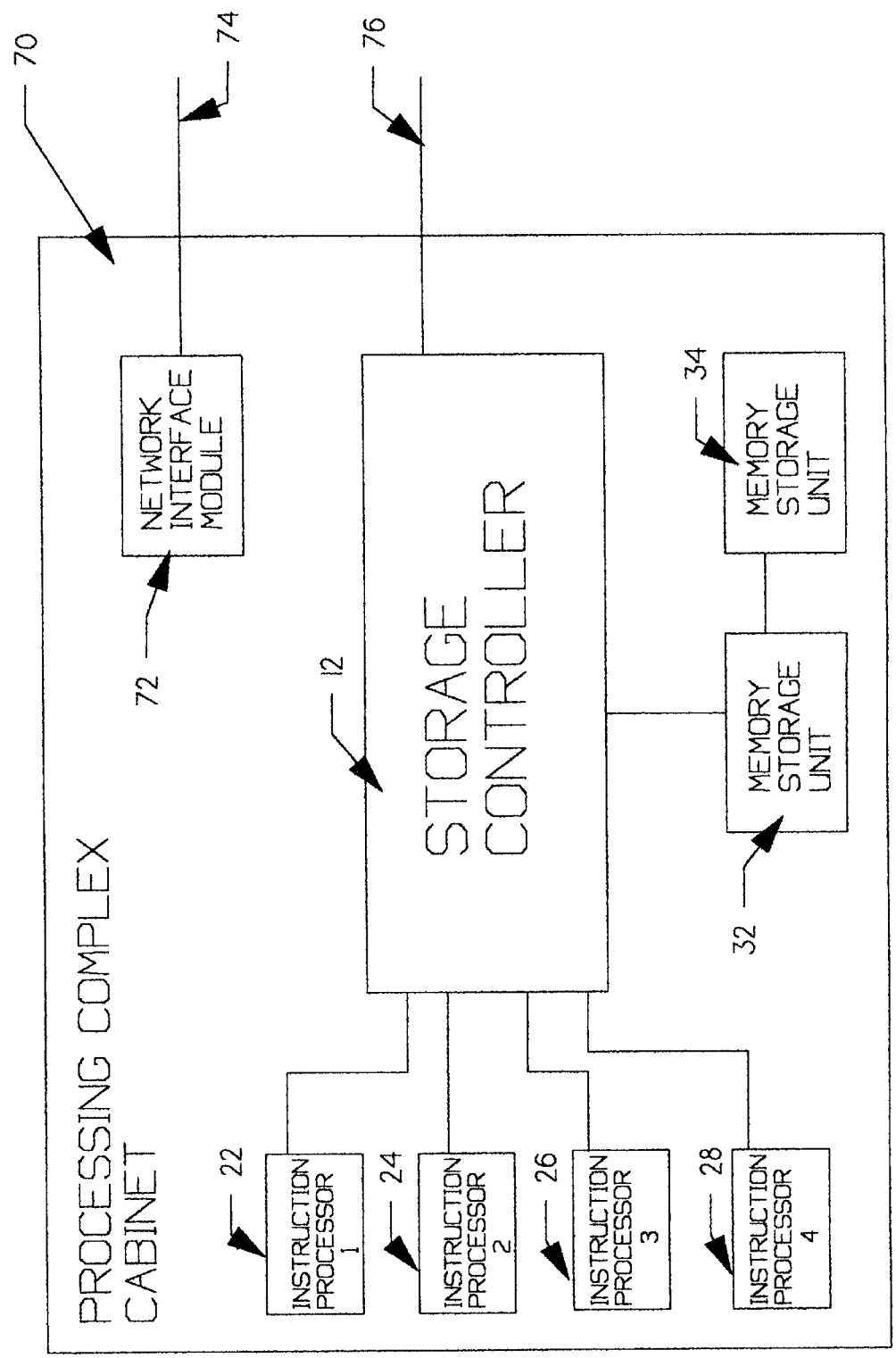
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 70. Within fully populated PCC 70 is located instruction processors 22, 24, 26 and 28 (i.e., IP1, IP2, IP3 and IP4). In the preferred mode, each of these instruction processors is packaged on a single high density circuit board. The memory storage units 32 and 34 are coupled to storage controller 12 as explained above.

Network interface module (i.e., NIM) 72 provide an interface to the operator console via cable 74. Cable 76 couples an input/output processor (not shown) to storage controller 12. Input/output processor is physically packaged in an Input/output Complex Cabinet (i.e., ICC) which is not shown for clarity. Other referenced elements are as previously described.

Figure 3:
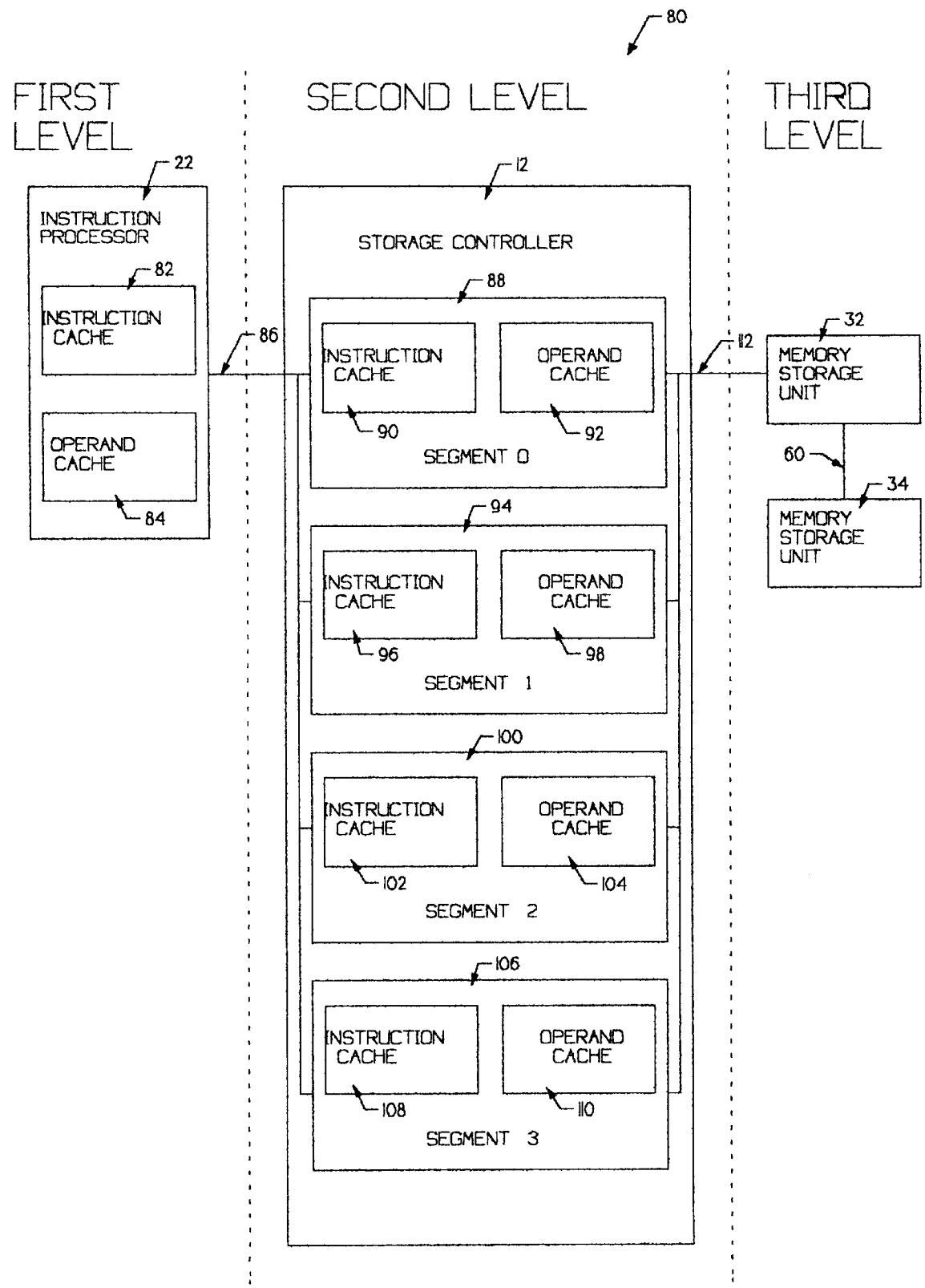
FIG. 3 is a schematic diagram of the levels of storage for a single instruction processor.

FIG. 3 is a diagram 80 showing the hierarchical arrangement of the three levels of storage within data processing system 10. Instruction processor 22 is within the first level of storage and contains an instruction cache 82 and an operand cache 84, each storing 8k of 36-bit words. These are internal to instruction processor 22 and dedicated to the operations undertaken therein. By partitioning the internal dedicated cache resources in this manner, there is a certain concurrence of cache accesses associated with normal instruction execution.

Upon the request of instruction processor 22 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 86 for the block of eight 36-bit words containing the desired data element. A more detailed explanation of the operation of instruction cache 82 and operand cache 84 is found below.

Storage controller 12 is within the second level of storage. The storage controller contains multiple segments wherein each segment contains a 128k 36-bit word instruction cache and a 32k 36-bit words operand cache. In the present illustration, segment 0-88 has instruction cache 90 and operand cache 92, segment 1-94 has instruction cache 96 and operand cache 98, segment 2-100 has instruction cache 102 and operand cache 104, and segment 3-106 has instruction cache 108 and operand cache 110. These cache resources are shared by all users of the two memory storage units within the cluster to include both local and remote users. Any memory request to storage controller 12 is routed to the appropriate directory of instruction cache 90 or operand cache 92 in segment 0-88, instruction cache 96 or operand cache 98 in segment 1-94, instruction cache 102 or operand cache 104 in segment 2-100, or instruction cache 108 or operand cache 110 in segment 3-106 to determine if the desired data element is present and valid. Each of the instruction and operand cache memories within segment 0-88, segment 1-94, segment 2-100 or segment 3-106 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either of instruction cache 90 or operand cache 92 in segment 0-88, instruction cache 96 or operand cache 98 in segment 1-94, instruction cache 102 or operand cache 104 in segment 2-100, or instruction cache 108 or operand cache 110 in segment 3-106 (depending upon the requested address), the data will then be requested from the third level of storage. Storage controller 12 is coupled to memory storage units 32 and 34 in the third level of storage via interface 112. In the preferred mode, memory storage units 32 and 34 each contain up to 256 megawords of storage.

Each data element request to storage controller 12 is made through a separate interface. For a fully populated system, this includes four instruction processors, one input/output processor, and one other storage controller (see also, FIG. 1). The two configurations typically used are the entry-level (EC) configuration (see, also FIG. 4) and the maximum-level (MC) configuration (see also, FIG. 5). In addition there are four address interleave choices available. These are the EC configuration with and without address interleave (see also, FIG. 11 and FIG. 12), and the MC configuration with and without address interleave (see also, FIG. 13 and FIG. 14). Each data element request as discussed above is divided between instruction cache 90 or operand cache 92 in segment 0-88, instruction cache 96 or operand cache 98 in segment 1-94, instruction cache 102 or operand cache 104 in segment 2-100, or instruction cache 108 or operand cache 110 in segment 3-106, depending upon the requested address. Only if the requested data element is not validly present in the appropriate second level cache resource is an access request made to the third level of storage to memory storage units 32 or 34.

Figure 4:
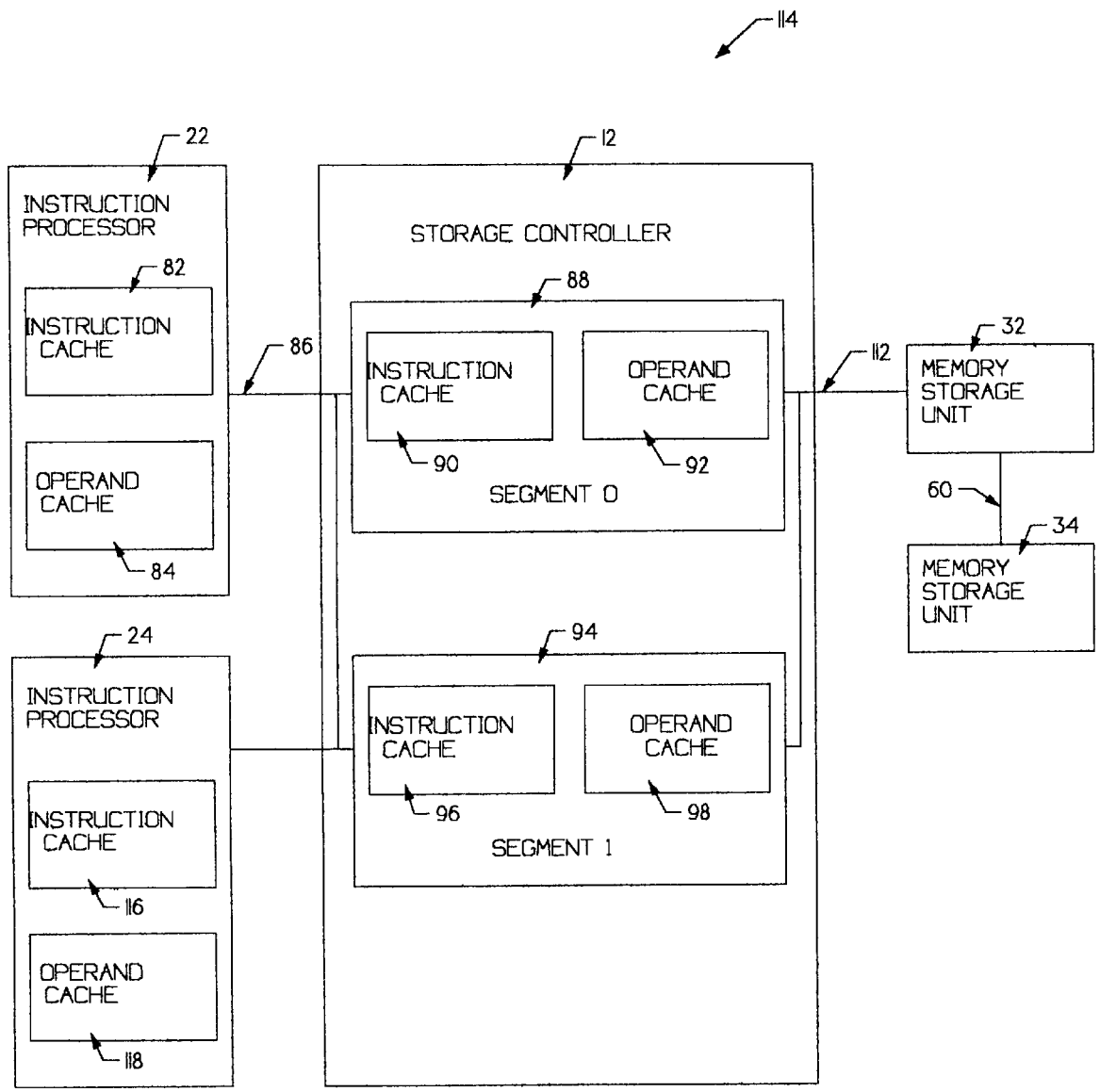
FIG. 4 is a schematic diagram showing the entry-level (EC) configuration.

FIG. 4 is a diagram 114 showing the entry-level (DEC) configuration of the three levels of storage within data processing system 10. Instruction processor 22 which contains instruction cache 82 and an operand cache 84, and instruction processor 24 which contains instruction cache 116 and operand cache 118, are within the first level of storage. Instruction cache 82 and operand cache 84, as well as instruction cache 116 and operand cache 118, each store 8k of 36-bit words. These are internal to instruction processor 22 and instruction processor 24 and are dedicated to the operations undertaken therein. Thus by partitioning the internal dedicated cache resources in this manner, there is a certain concurrence of cache accesses associated with normal instruction execution.

Upon the request of either instruction processor 22 or instruction processor 24 to access a particular data element as either an instruction or operand, the directory of instruction cache 82 or operand cache 84 in the case of instruction processor 22, or instruction cache 116 or operand cache 118 in the case of instruction processor 24 is queried to determine if the required data element is present within the associated cache resource. If the data element is present and valid, the access is completed at that level. If not, access is made to storage controller 12 via interface 86 for the block of eight 36-bit words containing the desired data element.

Storage controller 12 is within the second level of storage. The storage controller contains two segments in the EC mode which can support up to two instruction processors. Each segment contains a 128k 36-bit word instruction cache and a 32k 36-bit words operand cache. In the EC configuration, segment 0-88 has instruction cache 90 and operand cache 92, and segment 1-94 has instruction cache 96 and operand cache 98. Thesescache resources are shared by all users of the two memory storage units within the cluster to include both local and remote users. Any memory request to storage controller 12 is routed to the appropriate directory of instruction cache 90 or operand cache 92 in segment 0-88, or instruction cache 96 or operand cache 98 in segment 1-94 to determine if the desired data element is present and valid. Each of the instruction and operand cache memories within segment 0-88 or segment 1-94 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either of instruction cache 90 or operand cache 92 in segment 0-88, or instruction cache 96 or operand cache 98 in segment 1-94, (depending upon the requested address), the data will then be requested from the third level of storage. Storage controller 12 is coupled to memory storage units 32 and 34 in the third level of storage via interface 112. In the EC mode, the total address space partitioned within memory storage units 32 and 34 to correspond to the instruction and operand cache memories within segment 0-88 or segment 1-94, is the same as the total address space partitioned to correspond to the instruction and operand cache memories within the four segments of the maximum-level (MC) configuration (see FIG. 5).

Figure 5:
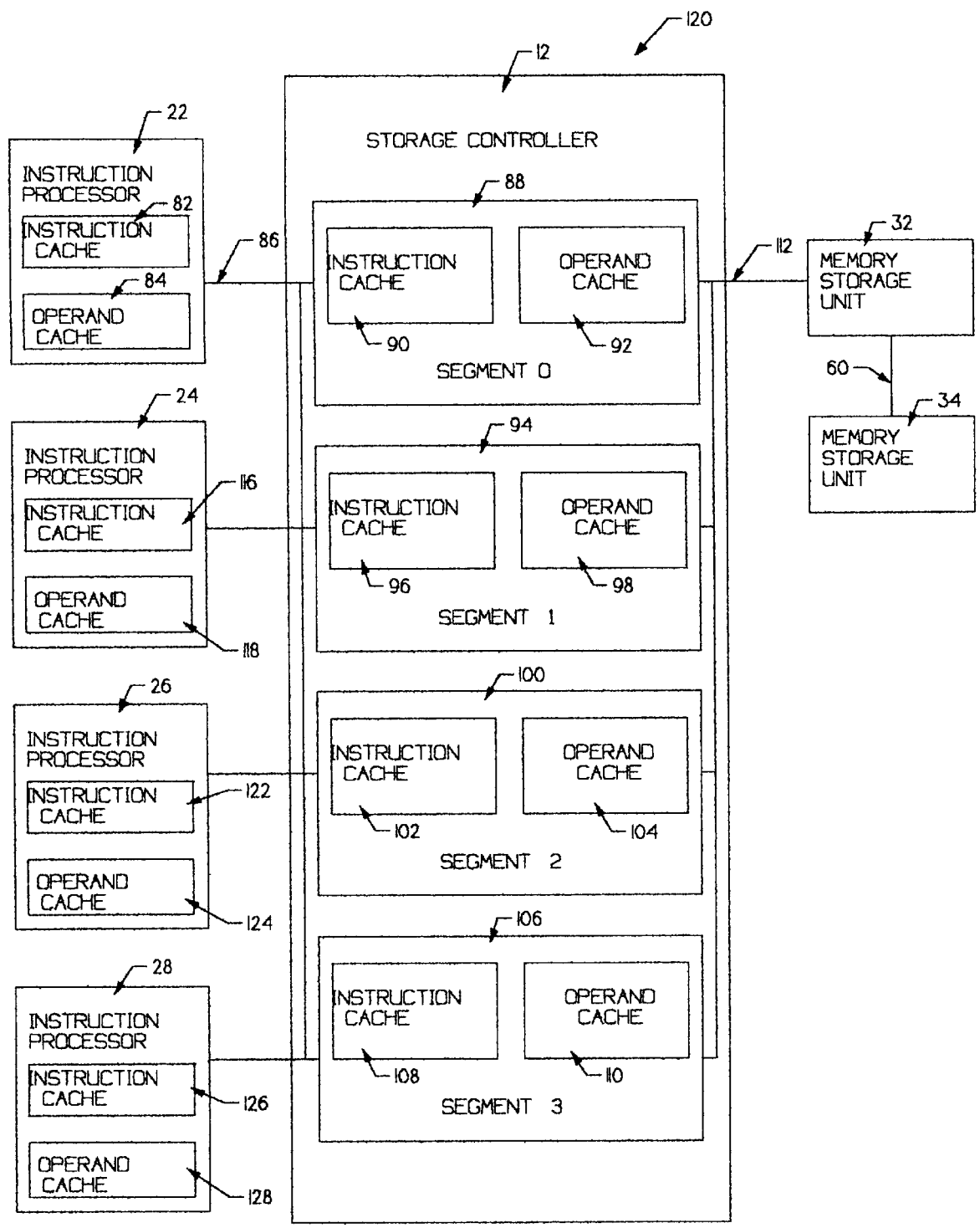
FIG. 5 is a schematic diagram showing the maximum-level (MC) configuration.

FIG. 5 is a diagram 120 showing the maximum-level (MC) configuration of the three levels of storage within data processing system 10. Instruction processor 22 which contains instruction cache 82 and an operand cache 84, instruction processor 24 which contains instruction cache 116 and operand cache 118, instruction processor 26 which contains instruction cache 122 and operand cache 124, and instruction processor 28 which contains instruction cache 126 and operand cache 128, are each within the first level of storage. Each instruction cache 82, 116, 122 and 126, as well as each operand cache 84, 118, 124 and 128, can store 8k of 36-bit words. Each instruction or operand cache within a particular instruction processor are internal to that instruction processor (e.g. instruction processor 22, 24, 26 or 28) and are dedicated to the operations undertaken therein. Thus by partitioning the internal dedicated cache resources in this manner, there is a certain concurrence of cache accesses associated with normal instruction execution.

Upon the request of either instruction processor 22, instruction processor 24, instruction processor 26 or instruction processor 28 to access a particular data element as either an instruction or operand, the directory of instruction cache 82 or operand cache 84 in the case of instruction processor 22, instruction cache 116 or operand cache 118 in the case of instruction processor 24, instruction cache 122 or operand cache 124 in the case of instruction processor 26, or instruction cache 126 or operand cache 128 in the case of instruction processor 28, are queried to determine if the required data element is present within the associated cache resource. If the data element is present and valid, the access is completed at that level. If not, access is made to storage controller 12 via interface 86 for the block of eight 36-bit words containing the desired data element.

Storage controller 12 is within the second level of storage. The storage controller contains four segments in the MC mode which can support up to four instruction processors. Each segment contains a 128k 36-bit word instruction cache and a 32k 36-bit word operand cache. In the MC configuration, segment 0-88 has instruction cache 90 and operand cache 92, segment 1-94 has instruction cache 96 and operand cache 98, segment 2-100 has instruction cache 102 and operand cache 104, and segment 3-106 has instruction cache 108 and operand cache 110. These cache resources are shared by all users of the two memory storage units within the cluster to include both local and remote users. Any memory request to storage controller 12 is routed to the appropriate directory of instruction cache 90 or operand cache 92 in segment 0-88, instruction cache 96 or operand cache 98 in segment 1-94, instruction cache 102 or operand cache 104 in segment 2-100, or instruction cache 108 or operand cache 110 in segment 3-106, to determine if the desired data element is present and valid. Each of the instruction and operand cache memories within segment 0-88, segment 1-94, segment 2-100 or segment 3-106 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either instruction cache 90 or operand cache 92 in segment 0-88, instruction cache 96 or operand cache 98 in segment 1-94, instruction cache 102 or operand cache 104 in segment 2-100, or instruction cache 108 or operand cache 110 in segment 3-106, (depending upon the requested address), the data will then be requested from the third level of storage. Storage controller 12 is coupled to memory storage units 32 and 34 in the third level of storage via interface 112. In the MC mode, the total address space partitioned within memory storage units 32 and 34 to correspond to the instruction and operand cache memories within segment 0-88, segment 1-94, segment 2-100 or segment 3-106 is the same as the total address space partitioned to correspond to the instruction and operand cache memories within the two segments of the entry-level (EC) configuration.

Figure 6:
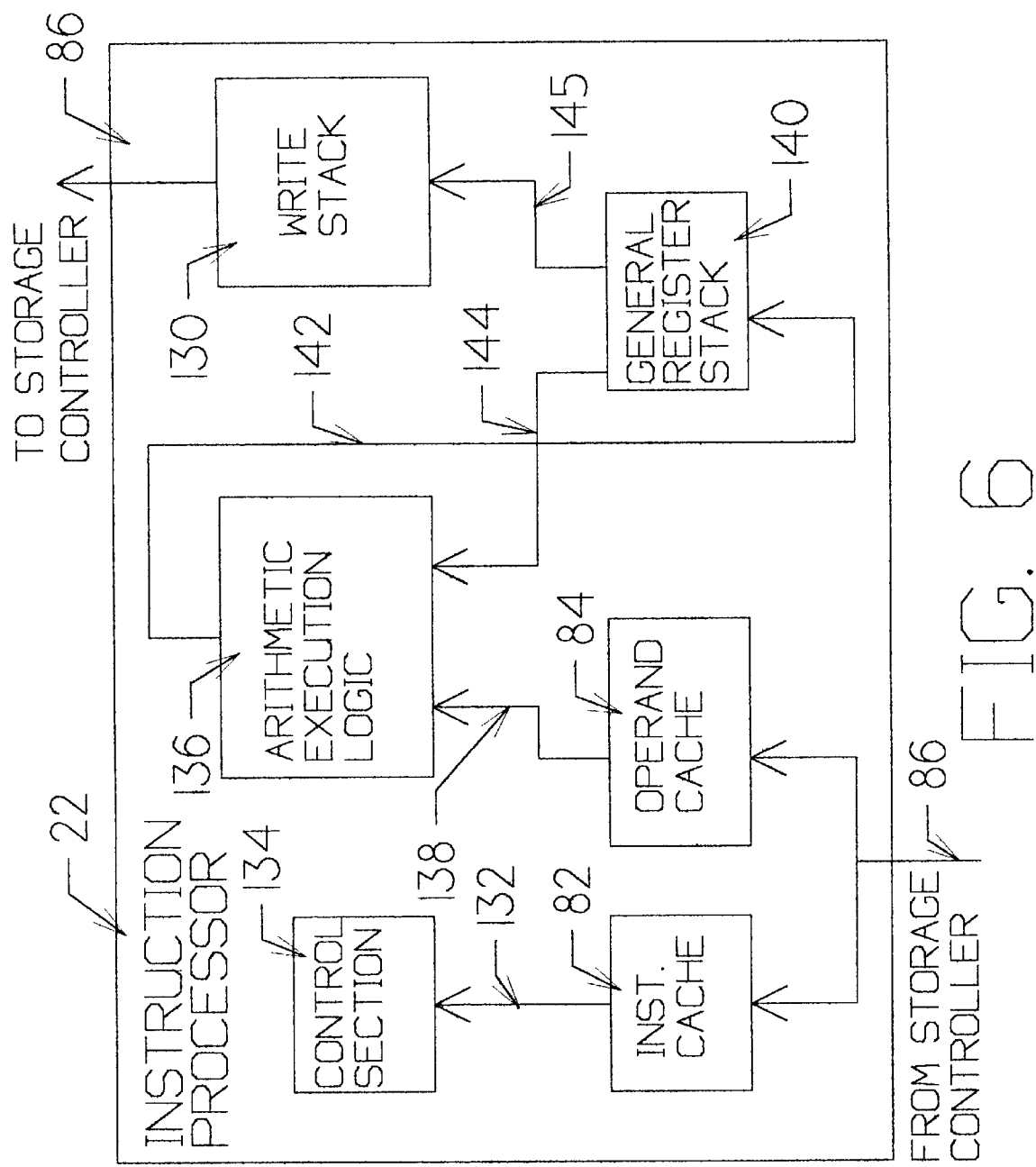
FIG. 6 is a simplified block diagram showing the major elements of the instruction processor.

FIG. 6 is a simplified block diagram of instruction processor 22 showing the major data and control paths. Interface 86, providing the data transfer path between storage controller 12 and instruction processor 22, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 22. Interface 86 also couples write data from write stack 130 to storage controller 12 for longer term storage. Priority for this shared interface is ordinarily given to read data requests requiring write data to be queued in write stack 130. The exception to giving priority to read data is whenever data is to be read from a location for which a write access has been queued.

Instructions from instruction cache 82 are provided via path 132 to control section 134 for decoding via microcode controller and hardwired control logic. Arithmetic execution logic 136 receives operand data via path 138 and performs the specified operation using a combination of microcode control and hardwired control as explained in greater detail below.

Most arithmetic instructions operate upon data which is temporarily stored in general register stack 140. This permits most rapid access to the data, because that data is directly accessed from an extremely fast storage stack. Similarly, arithmetic results are often returned to general register stack 140 for temporary storage until further arithmetic processing. Data is routed to general register stack 140 by path 142. Data from general register stack 140 is routed back to arithmetic execution logic 136 via path 144 and to write stack 130 via path 145. The data transferred to write stack 130 is queued for storage by storage controller 12 as discussed above.

Figure 7:
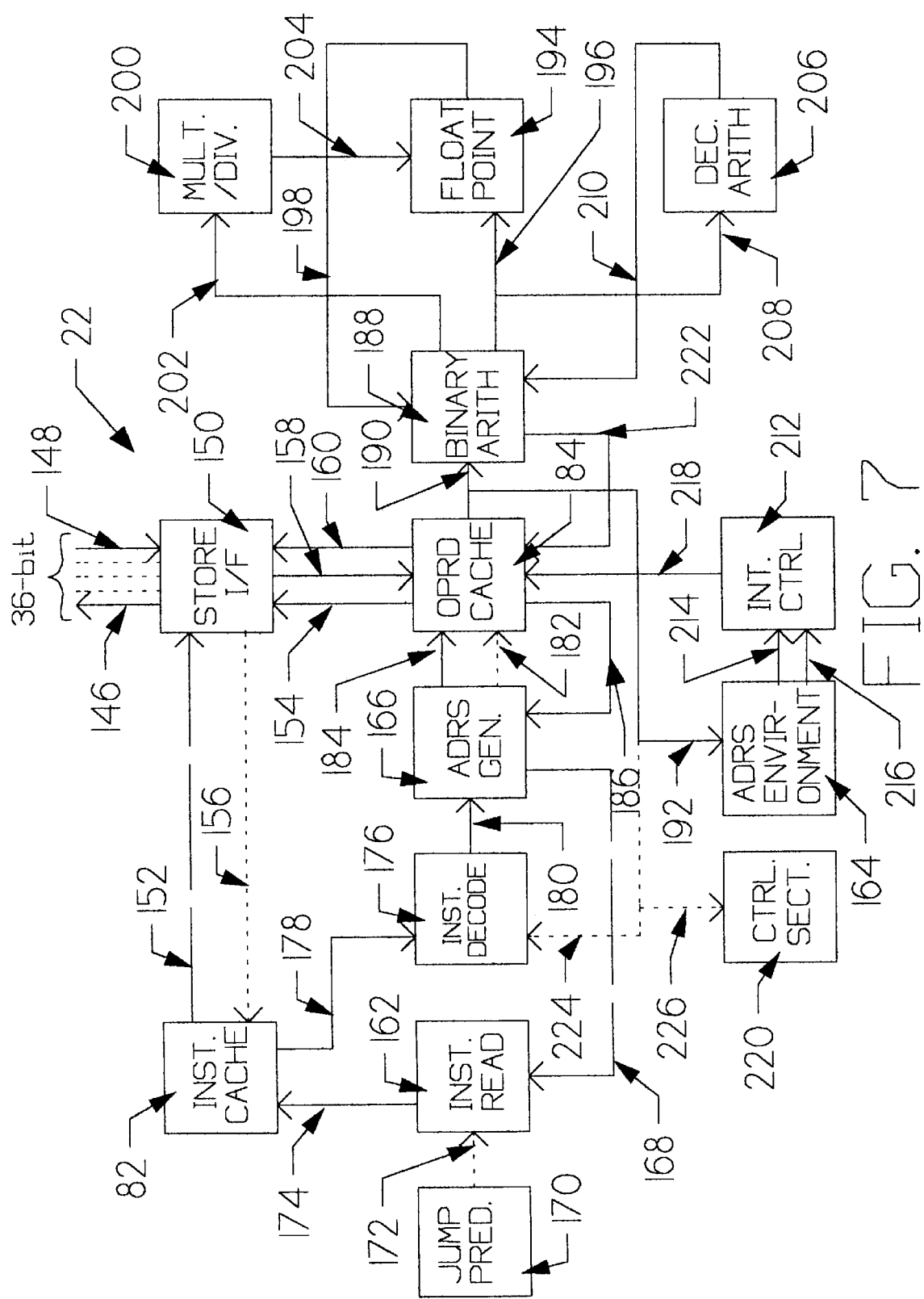
FIG. 7 is a detailed block diagram of the instruction processor.

FIG. 7 is a more detailed block diagram of instruction processor 22. The major data paths are shown, with the solid line paths signifying 72 bit, double word, transfer paths; and addressing paths; and the dotted lines indicating data paths of no greater than 36 bits. Control line paths are not shown for clarity.

The interface to storage controller 12 is via interface 86, as described above. It consists of write interface 146 and read interface 148. Each of these data paths couples a 36-bit word in parallel fashion. The function of write stack 130 (see also FIG. 6) is incorporated within store interface 150 which also provides the request/acknowledge synchronization logic. Addressing information for store interface 150 is sent from instruction cache 82 via interface 152 and operand cache 84 via interface 154 for a corresponding cache miss. Instructions are sent to instruction cache 82 via path 156. Because instructions are 36-bit words, path 156 has a width of 36 bits. Operand data read by storage controller 12 is transferred from store interface 150 to operand cache 84 by path 158. Similarly, write operand data is sent from operand cache 84 to store interface 150 via path 160. Both path 158 and path 160 have a width of 72 bits to accommodate double word operands.

Instructions to be executed are addressed by instruction read 162. The addresses are computed using one of the base registers located within address environment 164. If the instruction is the next sequential instruction, its address is determined by incrementing the program address counter. If the instruction to be executed is addressed by a branch or jump instruction, the address may be computed by address generator 166 and supplied via path 168. Alternatively, the address may be supplied by jump prediction 170 via path 172 during operation in the jump prediction mode as explained in detail below. The address of the next instruction is provided to instruction cache 82 via path 174.

The next addressed instruction is fetched from instruction cache 82 if a match is found. If the request results in a cache miss, storage controller 12 is requested to read the memory block containing the instruction as discussed above. In either case, the instruction is provided to instruction decoder 176 via path 178. The instruction is decoded through the use of a microcode controller by instruction decode 176, and the operand address is computed by address generator 166 from the data received via path 180.

Operand cache 84 contains general register stack 140 (see also, FIG. 6). The cache is addressed by the output of address generator 166 received from path 182. Direct operands are received on path 184. If a match is not made in operand cache 84, a read request is made of storage controller 12 through store interface 150 as explained above. If a match is found in operand cache 84 or if the instruction specifies a direct operand received on path 184, the operand data is more immediately produced. In either case, the operand data is routed in accordance with the operation to be performed as specified by the instruction. Indirect operands cause the new operand address to be transferred to address generator 166 via path 186. Operands are transferred to binary arithmetic 188 for mathematical computation via path 190 or to address environment 164 via path 192.

Binary arithmetic 188 provides the basic control for all arithmetic operations to be performed on data received via path 190. Floating point operations are scaled and controlled by floating point logic 194 which receives operand data on path 196. Floating point results are returned to binary arithmetic 188 by path 198. Mult./div. 200 performs the basic multiplication and division operations for fixed point instructions. Operand data is received via path 202 and the products/quotients returned via path 204 and floating point logic 194. Decimal arithmetic 206 receives operand data on path 208 and returns results via path 210. Decimal arithmetic performs special purpose decimal operations.

Another category of instructions involves a change to the base registers within the addressing environment 164. The data is supplied to addressing environment 164 via path 192. Base register contents are supplied to interrupt control 212 via paths 214 and 216. Interrupt control 212 provides the interrupt data to operand cache 84 via path 218. Control section 220 provides the overall microcode control.

The operation of instruction processor 22 is intended to occur in the pipelined mode whenever feasible. The preferred mode utilizes a three stage pipeline. The operation of this pipeline may be found in U.S. patent application Ser. No. 07/762,276, entitled "Data Coherency Protocol for Multi-Level Cached High Performance Multiprocessor System", referenced co-pending application which has been incorporated herein by reference. The remaining referenced components are as previously discussed.

Figure 8:
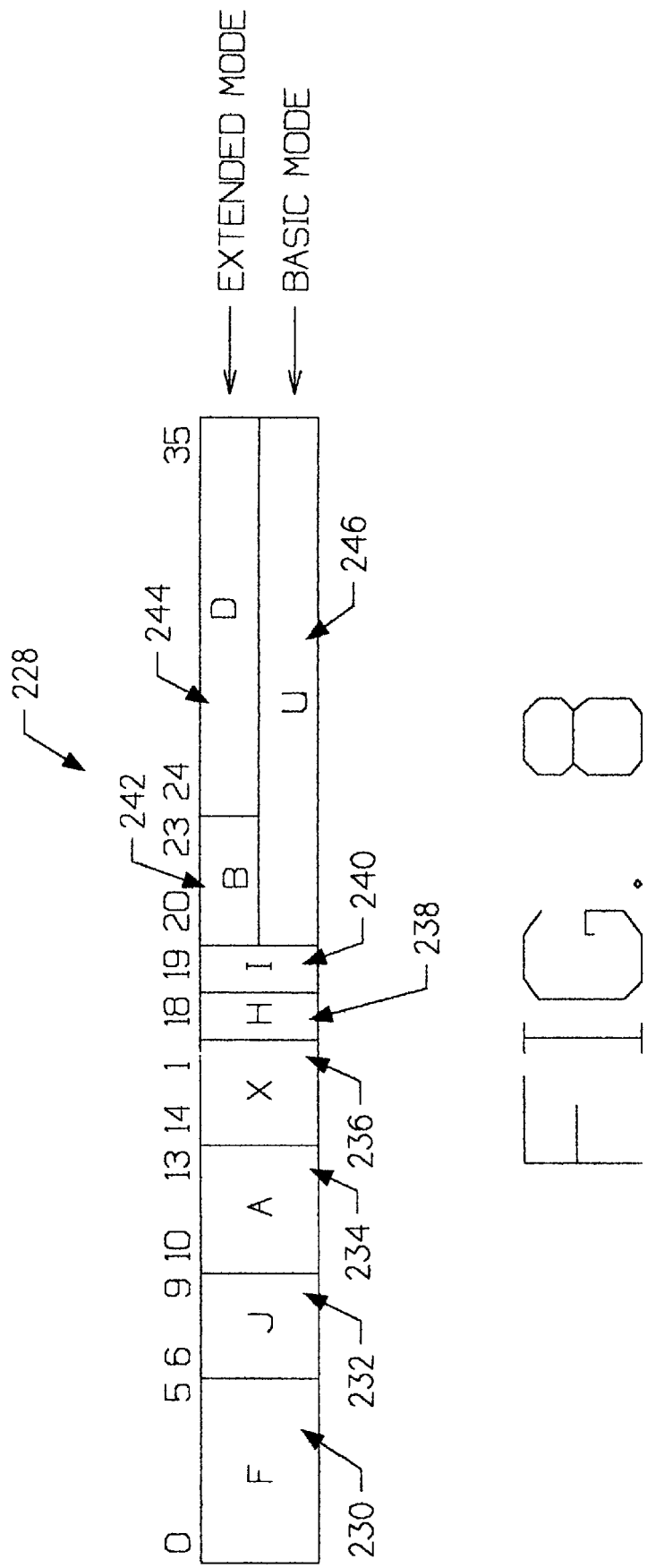
FIG. 8 shows the fields of a typical 36-bit machine instruction both extended mode and basic mode format.

FIG. 8 shows the field format of a typical 36-bit machine instruction in both extended mode and basic mode format. The diagram is generally shown at 228. The F-field 230 or Function Code, including bits 0 through 5, specifies the operation to be performed by the instruction. The J-field 232, including bits 6 through 9, is sometimes combined with the F-field 230 to act as part of the Function Code, but usually represents an instruction operand qualifier indicating whether the instruction operand is the entire 36-bit word specified by the instruction operand address, a subfield of that word or the instruction operand address itself (immediate operand). The A-field 234, located at bits 10 through 13, is usually the register operand address specifying the address of the register containing the operand. However, for some instructions the A-field 234 acts as part of the Function Code 230. The X-field 236, at bits 14 through 17, is the index register (X-register) address specifying an index register to be used in the indexing operation to form the instruction operand address. The H-bit 238 at bit 18 is used to control index incrementation when the J-field of the instruction is non zero. The I-bit 240 at bit 19 indicates indirect addressing in basic mode unless the instruction specifies an immediate operand.

Generally, the "basic mode" denotes a basic set of machine instructions and capabilities, and "extended mode" denotes a set of machine instructions that includes the basic mode instructions plus a set of additional instructions, thereby providing extended operational capability. In extended mode, the I-bit 240 is used either as an extension to the B-field 242 or to indicate whether 18-bit or 24-bit relative addressing will be used. The B-field 242 at bits 20 through 23 in extended mode format is the base register selector which specifies a base register describing the bank containing the instruction operand. The displacement address in extended mode is specified by the D-field 244 (bits 24 through 35) and in basic mode by the U-field 246 (bits 20 through 35). Those fields contain a displacement value that is used in conjunction with the modifier portion of the index register specified by the X-field 236 to form an instruction operand relative address. A further discussion of the instruction format and the operation thereof can be found in the above-referenced U.S. patent application Ser. No. 07/762,282, entitled "Cooperative Hardware and Microcode Control System for Pipelined Instruction Execution".

FIG. 9 shows an exemplary base register stack. The diagram is generally shown at 248. The base register stack comprises a number of addressable base registers 250, 252, and 254. In a preferred embodiment, base register stack 248 comprises 15 base registers as shown. During initialization of an applications program, a selected set of base registers are loaded with a number of fields including a base register address field.

The base register stack 248 is used to allocate memory to each application program running on the data processing system. This is accomplished by using a virtual addressing scheme, wherein each base register contains a base address which may be used to calculate an absolute address. A further discussion of absolute address generation may be found in the above-referenced U.S. patent application Ser. No. 07/762,282, filed Sep. 19, 1991, entitled "Cooperative Hardware and Microcode Control System for Pipelined Instruction Execution", which is incorporated herein by reference.

FIG. 10 shows the format for one entry 256 in one of the 15 user base registers. Each entry consists of four 36-bit words (i.e., words 258, 260, 262 and 264), wherein each word has lower quarter 266, second quarter 268, and upper half 270. Word 258 has a number of control bits 272 within lower quarter 266 and second quarter 268. Upper half 270 of word 258 contains access lock 274.

Lower limit 276 is located in lower quarter 266 of word 260. Upper limit 278 is located in upper half 270 of word 260. Upper limit 278 and lower limit 276 are used to set the security limits on user program access to the associated data segment.

The base address consists of portion 280 located in upper half 270 of word 262 and portion 282 located in the entire 36 bits of word 264. In this manner, an absolute storage space of 252 words of 36 bits each can be uniquely addressed by the absolute address.

Figure 11:
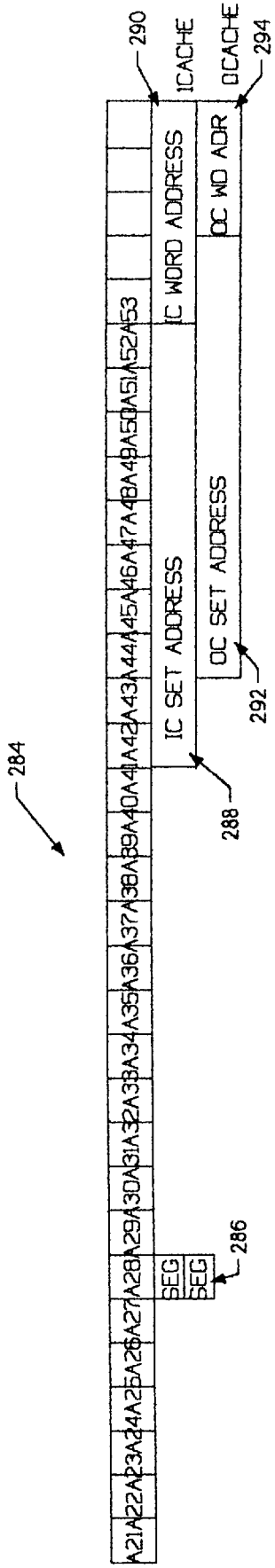
FIG. 11 shows the address mapping for the entry-level (EC) configuration without interleave.

FIG. 11 shows the address mapping for the open entry (EC) configuration without interleave. In the EC configuration, the address is divided into two independently operating segments (see also, FIG. 4). Thus, with both storage controller 12 and storage controller 16 (see also, FIG. 1), there is a total of 4 segments or servers which operate in parallel with each segment being dedicated to two instruction processors. The address mapping for the EC configuration without interleave is shown generally at 284. Segment select bit 286 is address bit A27 which defines the segment selected. A27 is selected because it is the most significant address bit within the minimum memory range available and results in toggling between the two segments every 64 megawords. Since address bit A27 is the most significant address bit and selects between one of two available segments, mapping occurs contiguously within a segment. Address 284 is a write through address and contains the instruction cache and operand cache address bits. The instruction cache address is divided into an instruction cache set address 288 which include address bits A39 through A48, and an instruction cache word address 290 which includes address bits A49 through A53. The operand cache address is divided into an operand cache set address 292 which includes address bits A41 through A50, and an operand cache word address 294 which includes address bits A51 through A53.

Figure 12:
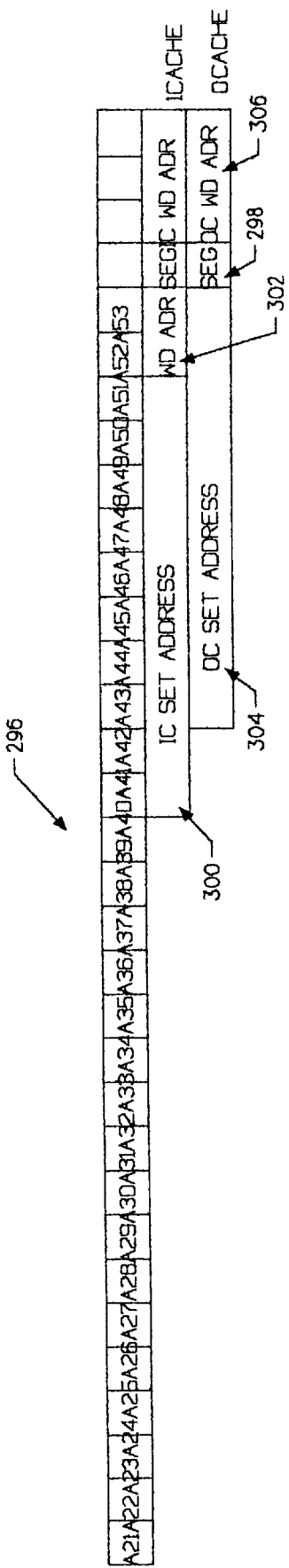
FIG. 12 shows the address mapping for the entry-level (EC) configuration with interleave.

FIG. 12 shows the address mapping for the entry level (EC) configuration with interleave. The address mapping for the EC configuration with interleave is shown generally at 296. With the EC configuration, the address is divided into two independently operating segments (see also, FIG. 4). Segment select bit 298, which is address bit A50, defines the segment selected and selects a new segment after every 8 word block. Thus, a segment does not contain a contiguous address range. Address bits A51 through A53 are contiguous bits and define the segment address field. Each combination of address bits A51 through A53 corresponds to one of eight address words or locations mapped contiguously within the selected segment. The maximum addressable range of A51 through A53 defines the number of address words mapped contiguously within the selected segment and thus is eight.

When interleave is selected for the EC mode, the instruction cache set address 300 is provided by A38 through A47 and is shifted left one bit from the EC mode without interleave (see also, FIG. 11). The instruction cache word address is defined by address bits A48 through A49 and A51 through A53. Here, instruction cache word address bits A48 and A49 are shifted left one bit from the EC mode without interleave to allow address bit A50 to perform the segment selection. Operand cache set address 304 is provided by address bits A40 through A49, which are shifted left one bit from the EC mode without interleave (see also, FIG. 11). Operand cache word address 306 is provided by address bits A51 through A53.

Figure 13:
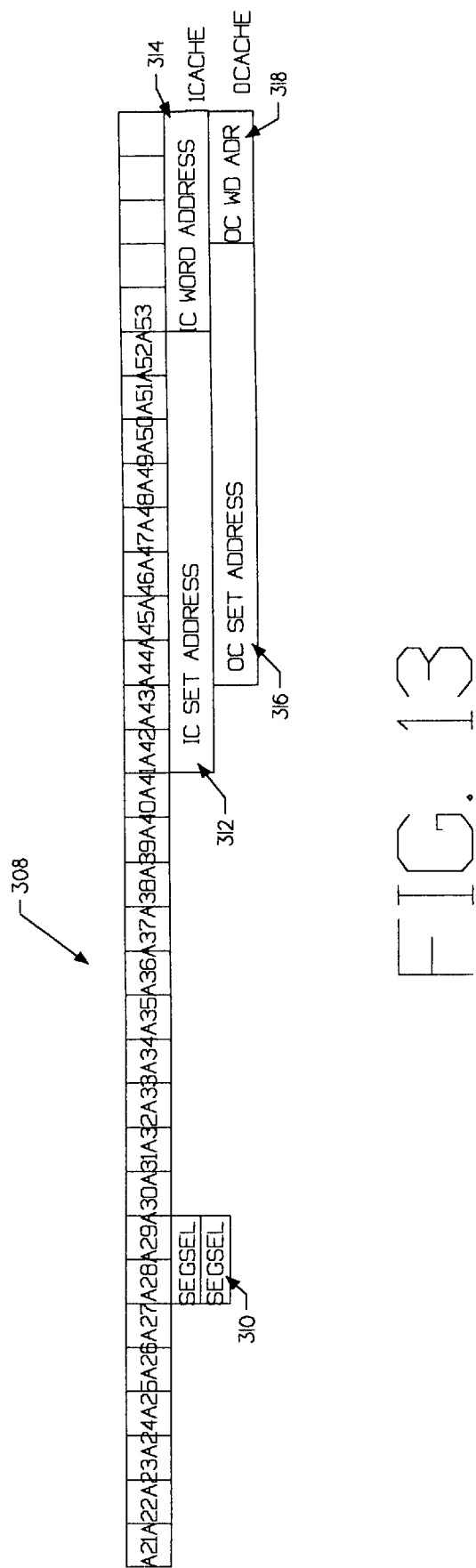
FIG. 13 shows the address mapping for the maximum-level (MC) configuration without interleave.

FIG. 13 shows the address mapping for the maximum-level (MC) configuration without interleave. In the MC configuration, each of two storage controls divides the memory address into four segments (see also, FIG. 5). Each segment operates independently which means that with two storage controls, there are a total of eight segments that operate in parallel, wherein each storage control is dedicated to a cluster of four instruction processors (see also, FIG. 5). The address mapping for the MC configuration without interleave is shown generally at 308. Segment select bits 310 are provided by address bits A27 and A28, which define the segment selected. A27 and A28 reside within the minimum memory range, wherein every 32 megawords will route to a different segment on the 0–3 basis. Thus, as address bits A27 and A28 select between one of four available segments, the memory mapping occurs contiguously within a segment. Instruction cache set address 312 is provided by address bits A39 through A48. Instruction cache word address 314 is provided by address bits A49 through A53. Operand cache set address 316 is provided by address bits A41 through A50. Operand cache word address 318 is provided by address bits A51 through A53.

Figure 14:
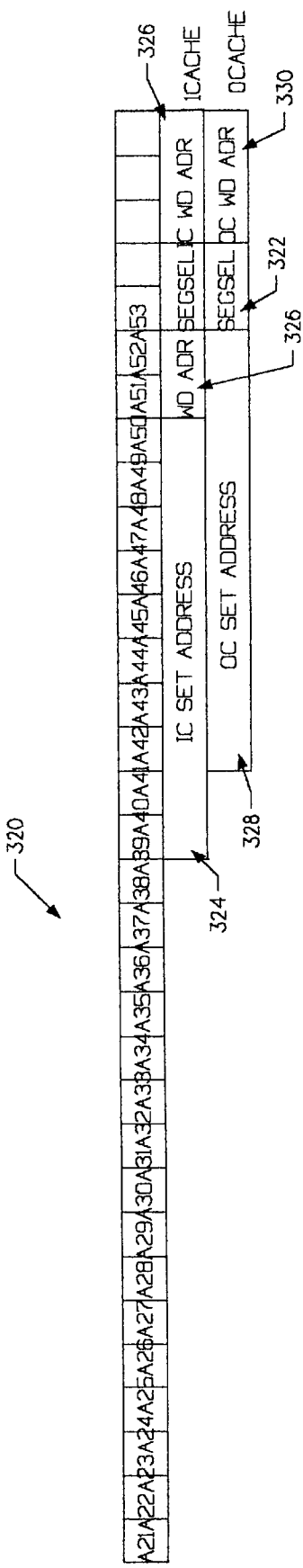
FIG. 14 shows the address mapping for the maximum-level (MC) configuration with interleave.

FIG. 14 shows the address mapping for the maximum level (MC) configuration with interleave. The address map for the MC configuration with interleave is shown generally at 320. In the MC configuration with interleave, segment select bits 322 are provided by address bits A49 and A50. Address bits A49 and A50 select between one of four available segments so that a new segment is selected after every eight word block. Thus, a segment does not contain a contiguous-address range. Address bits A51 through A53 are contiguous bits and define the segment address field. Each combination of address bits A51 through A53 corresponds to one of eight address words or locations mapped contiguously within the selected segment. The maximum addressable range of A51 through A53 defines the number of address words mapped contiguously within the selected segment and thus is eight.

When interleave is selected for the MC mode, the instruction cache set address 324 is provided by address bits A37 through A46 which are shifted left two bits from the MC configuration without interleave (see also, FIG. 13). This allows bits A49 and A50 to perform the segment selection. Instruction cache word address 326 is provided by address bits A47 and A48 which are shifted left two bits as well, and by address bits A51 through A53. Operand cache set address 328 is provided by address bits A39 through A48 which are shifted left two bits over the MC configuration without interleave (see also, FIG. 13). The operand cache word address 350 is provided by address bits A51 through A53.

FIG. 15 shows a segment address interleave map. The segment interleave map is shown generally at 322. When interleave is selected for either the entry-level (EC) or maximum-level (MC) mode, the instruction cache set address and operand cache set address and a portion of the instruction cache word address must be shifted left by one bit for the EC mode, or two bits for the MC mode. The instruction cache set address, instruction cache word address, operand cache set address, and operand cache word address inputs must be multiplexed (see also, FIGS. 17 and 18). The multiplexer selection is provided by two scannable interleave scan bits 334 which are configuration bit 336 and interleave bit 338. Configuration bit 336 and interleave bit 338 select one of four. If configuration bit 336 and interleave bit 338 are both zero, EC configuration without interleave is selected. If configuration bit 336 is zero and interleave bit 338 equals one, the EC configuration with two-way interleave is selected. If the configuration bit 336 equals 1 and the interleave bit 338 equals 0, the MC configuration without interleave is selected. If the configuration bit 336 equals 1 and the interleave bit 338 equals 1, the MC configuration with four-way interleave is selected. The segment selection for the EC and MC modes is provided by requestor address 340 through address bits A27, A28, A49 or A50, depending upon the configuration selected (see also, FIGS. 11–14). If configuration bit 336 and interleave bit 338 are both equal to 0, the EC mode without interleave is selected as indicated at 342 and 344. At 342, requester address 340 address bit A27 is 0 and segment 0 is selected as shown at segment selection 366. At configuration 344, requester address 340 address bit A27 equals 1 and segment selection 366 shows segment 2 is selected. At 346, configuration bit 336 is equal to 0 and interleave bit 338 equals 1, and the EC configuration with two-way interleave is selected. Requestor address 340 address bit A50 equals 0, thus, segment 0 is selected. At configuration 348, configuration bit 336 equals 0 and interleave bit 338 equals 1, and the EC mode with two-way interleave is selected. Requestor address 340 address bit A50 equals 1, thus, segment selection 366 indicates segment 2 is selected. At configuration 350, configuration bit 336 equals 1 and interleave bit 338 equals 0, and the MC mode with no interleave is selected. Requestor address 340 shows four combinations of address bits A27 and A28, while the MC configuration without interleave is selected. Thus, at configuration 350 when A27 equals 0 and A28 equals 0, segment selection 366 indicates segment 0 is selected. At configuration 352, when A27 equals 0 and A28 equals 1, segment selection 366 indicates segment 1 is selected. At configuration 354, when A27 equals 1 and A28 equals 0, segment selection 366 indicates segment 2 is selected. At configuration 356, when A27 equals 1 and A28 equals 1, segment selection 366 indicates segment 3 is selected. When configuration bit 336 and interleave bit 338 are both equal to 1, the MC mode with four-way interleave is selected. At configuration 358, address bit A49 equals 0 and address bit A50 equals 0 and segment selection 366 indicates segment 0 is selected. At configuration 360, A49 equals 0 and A50 equals 1, and segment selection 366 indicates segment 1 is selected. At configuration 362, A49 equals 1 and A50 equals 0, and segment selection 366 indicates segment 2 is selected. At configuration 364, A49 equals 1 and A50 equals 1, and segment selection 366 indicates segment 3 is selected.

Figure 16:
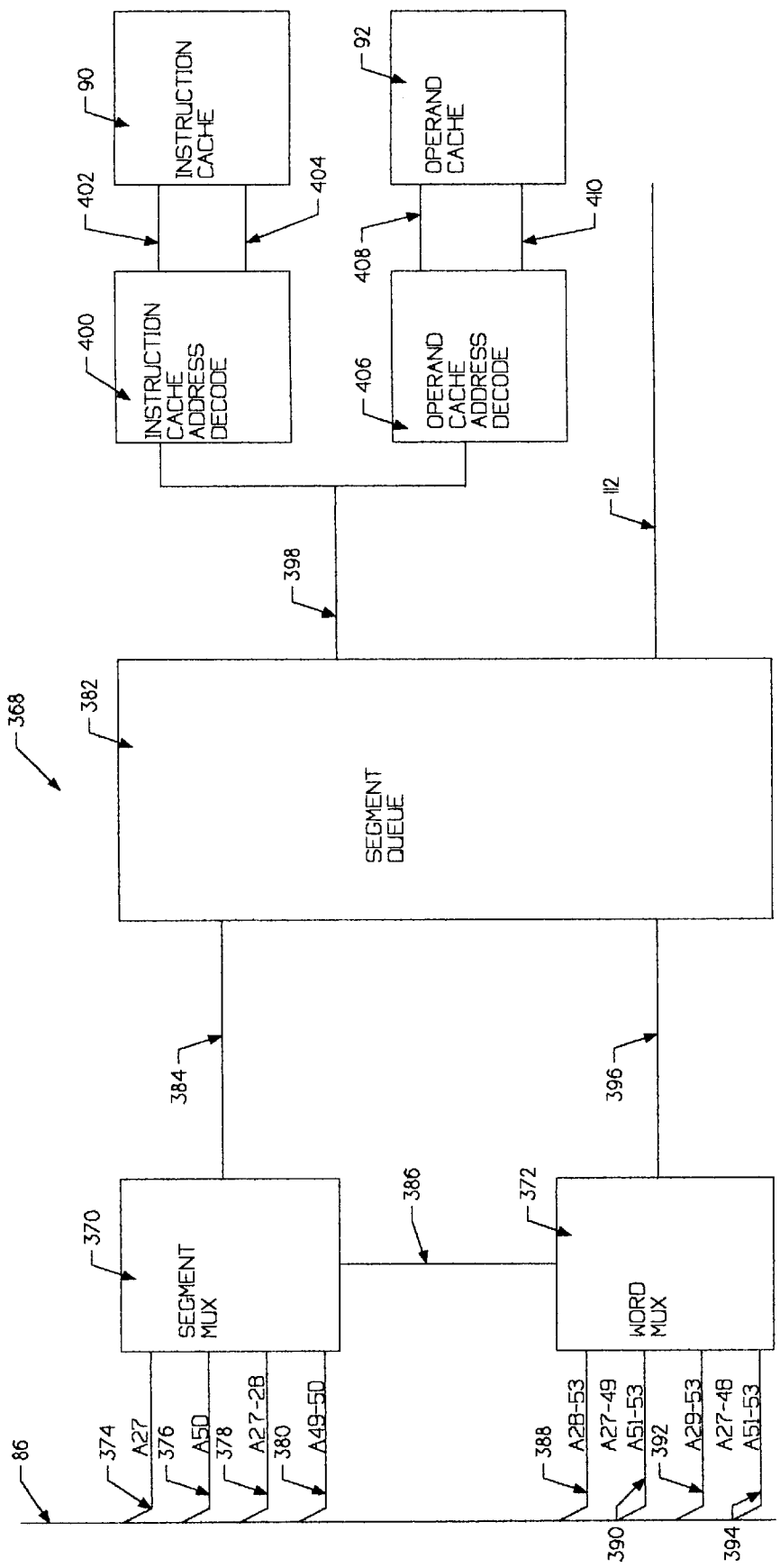
FIG. 16 is a block diagram showing the segment select.

FIG. 16 is a block diagram showing the major elements of the segment select. Each of segments 0 88, segment 1 94, segment 2 100, or segment 3 106 within storage controller 12 (as well as storage controller 16) contains segment select 368. Segment mux 370 and word mux 372 both couple to instruction processor 22, instruction processor 24, instruction processor 26 and instruction processor 28. Segment mux 370 has address bit A27 at 374, address bit A50 at 376, address bits A27 through A28 at 378, and address bits A49 through A50 at 380, all as inputs.

Segment select 368 performs the segment selection illustrated in FIG. 15. Each instance of segment select 368 corresponds with the number of segments available for selection. Thus, with the EC configuration with no interleave or two-way interleave, two segments are selected and two instances of segment select 368 are available. With the MC configuration without interleave or with four-way interleave, four segments are selected from and four instances, one corresponding to each segment, of segment select 368 are available. If segment select 368 is associated with segment 0 88, segment select 368 is selected when segment mux 370 decodes a segment select address corresponding to segment 0 88. Thus, if configuration bit 336 and interleave bit 338 of scan bits 344 are both equal to 0, the EC configuration without interleave is selected, and a 0 is decoded at address bit 27 at 374. If configuration bit 336 is equal to 0 and interleave bit 338 is equal to 1, the EC configuration with two-way interleave is selected and a 0 is decoded at address bit A50 at 376 to select segment select 368. If configuration bit 336 is equal to 0 and interleave bit 338 is equal to 1, the EC configuration with two-way interleave is selected and a zero is decoded at address bit A50 at 376 to select segment select 368. If configuration bit 336 is equal to 1 and interleave bit 338 is equal to 0, the MC configuration without interleave is selected. Address bit A27 equals 0 and address bit A28 equals 0 is decoded at 378 to select segment select 368. If configuration bit 336 equals 1 and interleave bit 338 equals 1, the MC mode with four-way interleave is selected. Address bit A49 equals 0 and address bit A50 equals 0 is decoded at 380 to select segment select 368. Once segment select 368 is decoded in any of the four modes, the segment select bits are passed as the most significant bits to segment queue 382 via path 384. In addition, word mux 372 is enabled through path 386 to multiplex the main address bits for access of memory storage unit 0 32 or memory storage unit 1 34. Thus, if configuration bit 336 is equal to 0 and interleave bit 338 is equal to 0, the EC configuration without interleave is selected and word mux 372 selects address bits A28 through A53 at 388 and multiplexes them to segment queue 382 via path 396. If configuration bit 336 is equal to 0 and interleave bit 338 equals 1, the EC configuration with no interleave is selected and word mux 372 selects address bits A27 through A49 and A50 through A53 and provides them to segment queue 382 via path 396. If configuration bit 336 is equal to 1 and interleave bit 338 is equal to 0, the MC configuration without interleave is selected and word mux 372 multiplexes address bits A29 through A53 via path 392 to segment queue 382 via path 396. If configuration bit 336 equals 1 and interleave bit 338 equals 1, the MC configuration with interleave is selected and address bits A27 through A48 and A51 through A53 at 394 are multiplexed by segment queue 382 via path 396. Segment queue performs an address write through to instruction cache 90 and operand cache 92 when accessing memory storage unit 0 332 and memory storage unit 1 334. In addition, segment queue 382 stacks address requests for access of data from memory storage unit 0 332 or memory storage unit 1 334. Depending on whether and instruction or operand is being accessed, if the requested data is not available and instruction cache 90 or operand cache 92 the access to memory storage unit 0 32 and memory storage unit 1 34 will be completed. Instruction cache address decode 400 decodes the instruction cache set address and instruction cache word address corresponding to the EC configuration without interleave, the EC configuration with two-way interleave, the MC configuration without interleave, or the MC configuration with four-way interleave (see, FIGS. 11–14). Instruction cache 90 receives the instruction cache set address via path 402 and the instruction cache word address via path 404 and determines if the requested data is available. If operand cache 92 is accessed, operand cache address decode 406 decodes the operand cache set address and operand cache word address corresponding to either the EC configuration without interleave, the EC configuration with two-way interleave, the MC configuration without interleave, or the MC configuration with four-way interleave. Depending upon the configuration selected, operand cache 92 receives the operand cache set address via path 408 and the operand cache word address via path 410 and determines if the requested data is available. and determines if the data is available. If the data is not available within instruction cache 90 or operand cache 92, the requested data is retrieved from memory storage unit 0 32 or memory storage unit 1 34 via path 112.

FIG. 17 is a block diagram showing the instruction cache address decode. The instruction cache address decode is shown generally at 412 and couples to instruction cache 90 via paths 402 and 404. Set address mux 414 has address bits A39 through A48 at 416, address bits A38 through A47 at 418, address bit A39 through A48 at 420, and has address bits A37 through A46 at 422. Address bit inputs 416, 418, 420 and 422 of said address mux 414 correspond respectively with instruction cache set address 288 in FIG. 11, instruction cache set address 300 in FIG. 12, instruction cache set address 312 in FIG. 13, and instruction cache set address 324 in FIG. 14. Word address mux 424 has address bits A49 through A50 at 426, address bits A48 through A49 at 428, address bits A49 through A50 at 430, and address bits A47 through A48 at 432. Address bits A51 through A53 are presented to instruction cache 90 directly via 433 without passing through word address mux 424. Address inputs 426, 428, 430 and 432 of word address mux 424 correspond respectively with instruction cache word address 290 of FIG. 11, instruction cache word address 302 of FIG. 12, instruction cache word address 314 of FIG. 13, and instruction cache word address 326 of FIG. 14. Instruction cache address decode also has scannable flip-flops 434 and 436 which couple to decode logic 438 through paths 440 and 442. Scannable flip-flops 434 and 436 have outputs 440 and 442 which correspond to configuration bit 336 and interleave bit 338 in FIG. 15. Thus, depending upon the configuration selected, scannable flip-flops 434 and 436 select through decode logic 438, either the EC configuration without interleave at 444, the EC configuration with two-way interleave at 446, the MC configuration without interleave at 448, and the MC configuration with four-way interleave at 450. Thus, depending upon the configuration selected via scannable flip-flops 434 and 436, set address mux 414 passes the corresponding 10-bit set address, and word address mux 424 passes the corresponding 5-bit word address (i.e. 2 multiplexed bits and 3 bits from 433), to instruction cache 90. Thus, if the EC mode without interleave is selected, set address mux 414 passes the address bits at 416 and word address mux 424 passes the address bits at 426, respectively, to instruction cache 90 via paths 402 and 404. If the EC mode with two-way interleave is selected, set address mux 414 passes address bit at 418 and word address mux 424 passes the address bits at 428 to instruction cache 90. If the MC mode without interleave is selected, set address mux 414 passes the address bits at 420 and the word address mux 424 passes the address bits at 430 to the instruction cache 90. If the MC configuration with four-way interleave is selected, set address mux 414 passes the address bits at 422 and the word address must 424 passes the address bits at 432 to the instruction cache 90.

FIG. 18 is a block diagram showing the operand cache address decode. The operand cache address decode is shown generally at 452 and is coupled to operand cache 92 through path 408 and path 410. Set address mux 454 has address bits A41 through A50 at 456 as inputs, address bits A40 through A49 at 458 as inputs, address bits A41 through A50 at 460 as inputs, and address bits A39 through A48 at 462 as inputs. The address inputs at 456, 458, 460 and 462 of set address mux 454 correspond with the operand cache set address 292 in FIG. 11, the operand cache set address 304 in FIG. 12, the operand cache set address 316 in FIG. 13, and the operand cache set address 328 in FIG. 14, respectively. The set address mux 454 selects one of the inputs of 456, 458, 460 or 462 and couples the selected input to the operand cache 92 via path 408. Word address bits A51 through A53 are coupled to operand cache 92 via path 410. Scannable flip-flops perform the configuration selection. Configuration flip-flop 474 and interleave flip-flop 476 via paths 480 and 482, respectively, couple to decode logic 478 to perform the configuration selection. Output 480 of configuration flip-flop 474 corresponds to configuration bit 336 of FIG. 15, and output 482 of interleave flip-flop 476 corresponds to interleave bit 338 of FIG. 15. Decode logic 478 depending upon the inputs at 480 and 482, select either the EC mode without interleave at 484, the EC mode with two-way interleave at 486, the MC mode without interleave at 488, or the MC mode with four-way interleave at 490. If the EC mode without interleave is selected at 484, set address mux 454 passes the address bits at 456 to operand cache 92 via path 408, and word address mux 406 passes the address bits at 466 to operand cache 92 via path 410. The address bits at 408 and 410 are a 10-bit set address and 3-bit word address, respectively. If the EC mode with two-way interleave is selected, set address mux 454 passes the address bits at 458 to operand cache 92. If the MC mode without interleave is selected, set address mux 454 passes the address bits at 460 to operand cache 92. If the MC mode with four-way interleave is selected, set address mux 454 passes the address bits at 462 to operand cache 92.

Figure 19A:
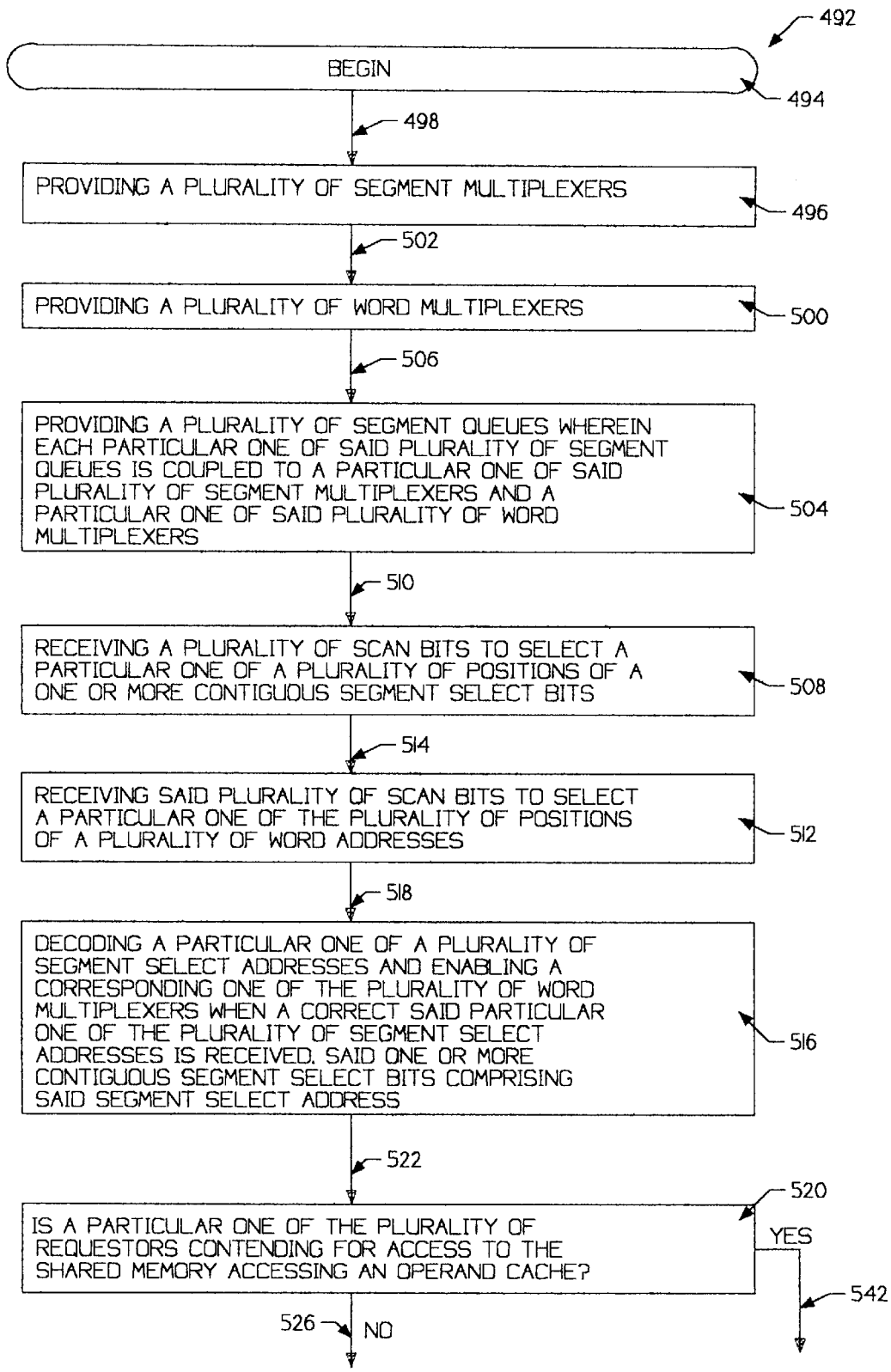
FIG. 19A and FIG. 19B are a flow diagram showing an exemplary method of the present invention.
Figure 19B:
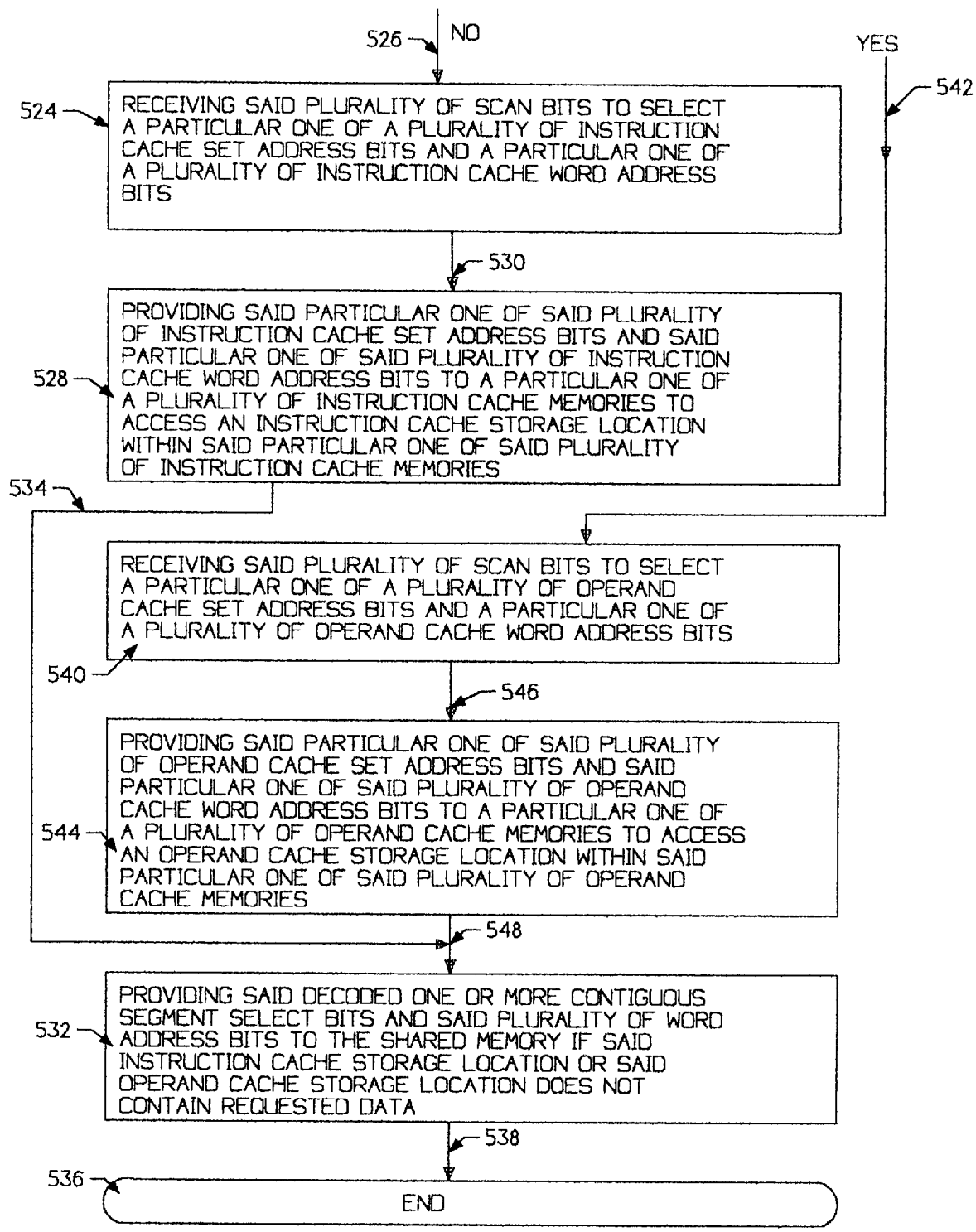

FIG. 19 is a flow diagram showing an exemplary method of the present invention. The diagram is generally shown at 492. The flow diagram is entered at element 494, wherein control is passed to element 496 via interface 498. Element 496 provides a plurality of segment multiplexers. Control is then passed to element 500 via interface 502. Element 500 provides a plurality of word multiplexers. Control is then passed to element 504 via interface 506. Element 504 provides a plurality of segment queues, wherein each particular one of said plurality of segment queues is coupled to a particular one of said plurality of segment multiplexers and a particular one of said plurality of word multiplexers. Control is then passed to element 508 via interface 510.

Element 508 receives a plurality of scan bits to select a particular one of a plurality of positions of a one or more contiguous segment select bits. Control is then passed to element 512 via interface 514. Element 512 receives said plurality of scan bits to select a particular one of the plurality of positions of a plurality of word address. Control is then passed to element 516 via interface 518. Element 516 decodes a particular one of a plurality of segment select addresses, and enables a corresponding one of the plurality of word multiplexers when a correct said particular one of the plurality of segment select addresses is received, said one or more contiguous segment select bits comprising said segment select address. Control is then passed to element 520 via interface 522. If the condition of a particular one of the plurality of requestors contending for access to the shared memory accessing an operand cache is not satisfied, control is passed to element 524 via interface 526. Element 524 receives said plurality of scan bits to select a particular one of a plurality of instruction cache set address bits and a particular one of a plurality of instruction cache word address bits. Control is then passed to element 528 via interface 530. Element 528 provides said particular one of said plurality of instruction cache set address bits and said particular one of said plurality of instruction cache word address bits to a particular one of a plurality of instruction cache memories to access, an instruction cache storage location within said particular one of said plurality of instruction cache memories. Control is then passed to element 532 via interface 534. Element 532 provides said decoded one or more contiguous segment select bits and said plurality of word address bits to the shared memory if said instruction cache storage location or said operand cache storage location does not contain requested data. Control is then passed to element 536 via interface 538 where the algorithm is exited.

If the condition at element 520 of a particular one of the plurality requestors contending for access to the shared memory accessing an operand cache is satisfied, control is passed to element 540 via interface 542. Element 540 receives said plurality of scanned bits to select a particular one of a plurality of operand cache set address bits and a particular one of a plurality of operand cache word address bits. Control is then passed to element 544 via interface 546. Element 544 provides said particular one of said plurality of operand cache set address bits and said particular one of said plurality of operand cache word address bits to a particular one of a plurality of operand cache memories to access an operand cache storage location within said particular one of said plurality of operand cache memories. Control is then passed to element 532 via interface 548. Element 532 provides said decoded one or more of contiguous segment select bits and said plurality of word address bits to the shared memory if said instruction cache storage location or said operand cache storage location does not contain requested data. Control is then passed to element 536 via interface 538 where the algorithm is exited.

Having thus described the preferred embodiments of the present invention, those of skill in the art will readily appreciate that the teachings found herein may be applied to yet other embodiments within the scope of the claims hereto attached.

What is claimed is:

1. An apparatus having a shared memory and a plurality of requesters wherein the plurality of requesters are contending for access to the shared memory, the shared memory having a plurality of segments, each of the plurality of segments having a plurality of address locations, comprising:

a. means for mapping said plurality of address locations noncontiguously within a particular one of the plurality of segments and including a memory address field having one or more contiguous segment select bits having a position within said memory address field;

b. means for associating each particular one of the plurality of segments with a particular one of a plurality of queues and having a segment select means, said segment select means for decoding the one or more contiguous segment select bits to select a particular one of the plurality of segments, each particular combination of the one or more contiguous segment select bits corresponding to a particular one of a plurality of segments, each selected particular one of the plurality of segments corresponding to the particular one of the plurality of queues; and c. wherein the segment select means further comprises:
 (1) segment multiplexing means to select the particular combination of the one or more contiguous segment select bits corresponding with the particular one of the plurality of segments selected;
 (2) word multiplexing means to select a particular combination of a one or more memory address bits from the memory address field corresponding with the particular one of the plurality of segments selected;
 (3) cache memory; and
 (4) segment queue coupled to said segment multiplexing means and said word multiplexing means for stacking address access requests for data, said segment queue providing the address request to the cache memory, and if the requested data is not available, providing the address request to the shared memory.

2. An apparatus according to claim 1 wherein the one or more contiguous segment select bits have a position wherein a least significant bit of the one or more contiguous segment select bits is more significant than a least significant bit of the memory address field, a difference between said least significant bit of the one or more contiguous segment select bits and said least significant bit of the memory address field defining a segment address field.

3. An apparatus according to claim 2 wherein the segment address field has one or more contiguous bits, each particular combination of the one or more contiguous bits corresponding to a particular one of a plurality of segment address locations.

4. An apparatus according to claim 3 wherein the segment address field has a maximum addressable range corresponding to a number of the plurality of address locations mapped contiguously within the particular one of the plurality of segments.

5. An apparatus according to claim 1 wherein the cache memory is comprised of an instruction cache memory and an operand cache memory.

6. An apparatus according to claim 5 further comprised of an instruction cache address decode coupled to the segment queue for selecting a particular combination of the one or more memory address bits and providing the one or more memory address bits to the instruction cache memory.

7. An apparatus according to claim 6 wherein the instruction cache address decode comprises:
 a. decode logic for selecting a particular one of a plurality of configurations, said particular one of said plurality of configurations defining a particular combination of the one or more memory address bits comprising an instruction cache set address and another particular combination of the one or more memory address bits comprising an instruction cache word address;
 b. set address multiplexer for providing said instruction cache set address to the instruction cache memory; and
 c. word address multiplexer for providing said instruction cache word address to the instruction cache memory.

8. An apparatus according to claim 6 further comprising an operand cache address decode, which comprises:
 a. decode logic for selecting a particular one of a plurality of configurations, said particular one of said plurality of configurations defining a particular combination of the one or more memory address bits comprising an operand cache set address and another particular combination of the one or more memory address bits comprising an operand cache word address;
 b. set address multiplexer for providing said operand cache set address to the instruction cache memory; and
 c. word address multiplexer for providing said operand cache word address to the instruction cache memory.

9. An apparatus according to claim 7 or 8 wherein the decode logic is further comprised of scannable means for determining which particular one of the plurality of configurations is being selected.

10. An apparatus according to claim 9 wherein the scannable means is a configuration flip-flop having a configuration bit and an interleave flip-flop having an interleave bit, the configuration bit and the interleave bit defining the particular one of the plurality of configurations being selected.

11. An apparatus according to claim 10 wherein the plurality of configurations are comprised of an entry-level configuration without interleave, an entry-level configuration with two way interleave, a maximum-level configuration without interleave, and a maximum-level configuration with four way interleave.

12. An apparatus having a shared memory and a plurality of requesters wherein the plurality of requesters are contending for access to the shared memory, the shared memory having a plurality of segments, each of the plurality of segments having a plurality of address locations, comprising:
 a. one or more contiguous segment select bits for selecting a particular one of the plurality of segments, said segment select bits having a position within a memory address field corresponding to a number of contiguous address locations mapped in a particular one of the plurality of segments, said number of contiguously mapped address locations being less than the plurality of address locations in the particular one of the plurality of segments;
 b. segment select means for decoding the one or more contiguous segment select bits to select a particular one of the plurality of segments, each particular combination of the one or more contiguous segment select bits corresponding to a particular one of a plurality of segments, each selected particular one of the plurality of segments corresponding to a particular one of a plurality of queues; and
 c. wherein the segment select means further comprises:
 (1) segment multiplexing means to select the particular combination of the one or more continuous segment select bits corresponding with the particular one of the plurality of segments selected;
 (2) word multiplexing means to select a particular combination of a one or more memory address bits from the memory address field corresponding with the particular one of the plurality of segments selected;

(3) a cache memory; and (4) segment queue coupled to said segment multiplexing means and said word multiplexing means for stacking address access requests for data, said segment queue providing the address request to the cache memory, and if the requested data is not available, providing the address request to the shared memory.

13. An apparatus according to claim 12 wherein the cache memory is comprised of an instruction cache memory and an operand cache memory.

14. Method for having a plurality of requesters contend for access to a shared memory wherein the shared memory has a plurality of segments, each of the plurality of segments has a plurality of address locations, comprising the steps of:

a. providing a plurality of segment multiplexers;

b. providing a plurality of word multiplexers;

c. providing a plurality of segment queues wherein each particular one of said plurality of segment queues is coupled to a particular one of said plurality of segment multiplexers and a particular one of said plurality of word multiplexers;

d. receiving a plurality of scan bits to select a particular one of a plurality of positions of a one or more contiguous segment select bits;

e. receiving said plurality of scan bits to select a particular one of the plurality of positions of a plurality of word addresses;

f. decoding a particular one of a plurality of segment select addresses and enabling a corresponding one of the plurality of word multiplexers when a correct said particular one of the plurality of segment select addresses is received, said one or more contiguous segment select bits comprising said segment select address;

g. performing steps (j) and (k) if a particular one of the plurality of requestors contending for access to the shared memory is accessing an operand cache otherwise performing steps (h) and (I);

h. receiving said plurality of scan bits to select a particular one of a plurality of instruction cache set address bits and a particular one of a plurality of instruction cache word address bits;

I. providing said particular one of said plurality of instruction cache set address bits and said particular one of said plurality of instruction cache word address bits to a particular one of a plurality of instruction cache memories to access an instruction cache storage location within said particular one of said plurality of instruction cache memories;

j. receiving said plurality of scan bits to select a particular one of a plurality of operand cache set address bits and a particular one of a plurality of operand cache word address bits;

k. providing said particular one of said plurality of operand cache set address bits and said particular one of said plurality of operand cache word address bits to a particular one of a plurality of operand cache memories to access an operand cache storage location within said particular one of said plurality of operand cache memories; and l. providing said decoded one or more contiguous segment select bits and said plurality of word address bits to the shared memory if said instruction cache storage location or said operand cache storage location does not contain requested data.

* * * * *